United States Patent [19]
Renouard et al.

[11] Patent Number: 6,161,123
[45] Date of Patent: *Dec. 12, 2000

[54] PROVIDING RELIABLE COMMUNICATION OVER AN UNRELIABLE TRANSPORT LAYER IN A HAND-HELD DEVICE USING A PERSISTENT SESSION

[75] Inventors: Julia J. Renouard, Shoreline; Alan Piercy, Everett; Steve Heckt; Joe Savarese, both of Edmonds, all of Wash.

[73] Assignee: Intermec IP Corporation, Beverly Hills, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/851,848

[22] Filed: May 6, 1997

[51] Int. Cl.$^7$ ........................................ G06F 13/00
[52] U.S. Cl. ............................................. 709/203
[58] Field of Search ........................ 395/200.53, 200.54, 395/200.55, 200.57, 200.58, 200.59, 200.67, 200.68, 182.02, 682; 370/468, 471, 351; 709/200, 201, 203, 217, 218, 219

[56] References Cited

U.S. PATENT DOCUMENTS

| | | | |
|---|---|---|---|
| 5,164,982 | 11/1992 | Davis | 379/93.17 |
| 5,515,508 | 5/1996 | Pettus et al. | 709/203 |
| 5,564,070 | 10/1996 | Want et al. | 455/53.1 |
| 5,610,595 | 3/1997 | Garrabrant et al. | 370/394 |
| 5,687,971 | 11/1997 | Khaladkar | 273/269 |
| 5,727,142 | 3/1998 | Chen | 714/2 |
| 5,751,719 | 5/1998 | Chen et al. | 370/473 |
| 5,802,293 | 9/1998 | Van der Sijpt | 709/203 |

OTHER PUBLICATIONS

J. Postel Isi, "User Datagram Protocol" Request For Comment, vol. RFC, No. 768, Aug. 28, 1980, pp. 1–3.
Partridge, C. et al., "A Faster UDP", IEE / ACM Transactions on Networking, vol. 1, No. 4, Aug. 1993, pp. 429–440.
"Network File System", Oct. 31, 1996, http://www.uwsg.indiana.edu/usail/network/nfs/overview.html, (visited Dec. 15, 1997.).
Network Working Group, "The TFTP Protocol (Revision 2)," Jul. 1992 http://nswt.tuwien.ac.at/Connected/RFC/1350/, (visited Dec. 15, 1997.).
Club Key Channels Mobile Office Messenger, "Narrowband Sockets", Mar. 7, 1997, http://www.club.nokia.com/nbs/N_b–s.html, (visited Dec. 15, 1997.).
Bakre, Ajay V., "Design and Implementation of Indirect Protocols for Mobile Wireless Environments", New Brunswick, New Jersey, pp. I–XVI and 1–175, Oct. 1996.
Marsh, Brian and Zenel, Bruce, "Power Measurements of Typical Notebook Computers", Technical Report TR–110–94, Matsushita Information Technology Laboratory, May 1994, pp. 1–13.

(List continued on next page.)

*Primary Examiner*—Moustafa M. Meky
*Attorney, Agent, or Firm*—Perkins Coie LLP

[57] ABSTRACT

The disclosed system provides a UDP+ connection-oriented protocol layer that reliably communicates over the UDP transport layer in a hand-held device. By providing reliable communication over the UDP transport layer instead of using the TAP transport layer, memory requirements are reduced, and applications running on the hand-held device have reliable data transfers performed on their behalf. Additionally, the UDP+ layer is designed to communicate using a "persistent session." A persistent session is a mode of communication where, when a connection terminates, the data associated with the connection, including the packets that have not yet been transferred, is not discarded. Instead, in using a persistent session, UDP+ retains the data associated with a connection after it terminates, reestablishes the connection, and completes the data transfer. By performing such a persistent session, application programs using UDP+ do not need to retain a copy of the packets passed to UDP+, and the code of the application programs is simplified, because the application programs do not need to keep track of which packets were successfully transferred when the connection terminates.

49 Claims, 10 Drawing Sheets

OTHER PUBLICATIONS

Perkins, Charles, "Mobile Networking within the IETF", 1996, http://athos. Rugers.edu/~sudame/ACM/tut4.html, (visited Dec. 1997.).

Mobile Ipv6 Agenda, Jun. 26, 1996, http://ds.internic.net/ietf/mobileip/mobileip–slides4–96jun.html, (visited Dec. 1997.).

Johnson, David B. and Perkins, Charles, "Mobility Support in Ipv6", Mobile IP Working Group Meeting, 36$^{th}$ IETF, Montreal, Jun. 24–28, 1996.

Tutorial Instructor—Charles Perkins, MobiCom '95 Tutorial, http://www.acm.org/sigcomm/mobicom95/biodata/perkins.html, Aug. 1995, (visited Dec. 1997.).

Perkins, Charlie, "T1: Mobile IP," *Tutorials*, MobiCom '95, Aug. 1995, http://www.acm.org/sigcomm/mobicom95/tutorials/tut.html, Dec. 1997.

Perkins, Charles, et al. "IMPH: A mobile host protocol for the Internet", Journal: Computer networks and ISDN systems, 27 (3), 1994, Pp. 479–491.

Perkins, Charles, "Mobile IP", Journal IEEE Communications Magazine, 1997, V35, N5, May 1997, pp. 84–87.

Myles, Andrew et al., "A Mobile Host Protocol Supporting Route Optimization and Authentication", IEEE Journal on Selected Areas in Communications, vol. 13, No. 5, Jun. 1995, pp. 839–849..

Bhagwat Pravin et al., Network Layer Mobility: An Architecture and Survey, IEEE Personal Communications, Jun. 1996, pp. 54–64.

Perkins, Charles, Providing continuous network access to mobile hosts using TCP/IP, Computer Networks and ISDN Systems 26 (1993) pp. 357–369.

"PCCA Mobile Connectivity '97", Portable Computer and Communications Association, 1997, 2 pages http://www.pcca.org/, (visited Feb. 1, 1998.).

"Mobile Connectivity Committee", Portable Computer and Communications Association, 1997, http://www.pcca.org/mobile–com/index.html, (visited Feb. 1, 1998.).

"PCCA Mobile Connectivity '97", Portable Computer and Communications Association, http://www.pcca.org/connectivity/index.html, (visited Feb. 1, 1998.).

"The Standards Committee", Portable Computer and Communications Association, Nov. 1997, http://www.pcca.org/standards–com/index.html, (visited Feb. 1, 1998.).

"Wireless Data Developer Program," Portable Computer and Communications Association, Modem Standards Committee, 2 pages, 1997, (visited Feb. 1, 1998).

PCCA Standard, "Data Transmission Systems Equipment", Official Standard, Issue A, Jun. 1995.

Burke, Chris, "Making the Corporate Connection: The Key to HPC Success", http://www.pcca.org/articles/burke.html, (visited Feb. 1, 1998.).

Burke, Chris, "Wireless and/or Remote Connectivity for Handheld Personal Computers (h/PCs)," PCCA Discussion Paper, 1996, http://www.pcca.org.articles/hobbs.html., (visited Feb. 1, 1998.).

Seybold, Andrew M., "Handheld Mobility: Taking it to the Desktop!", http://www.pcca.org/articles/mobility.html., Feb. 1, 1998.

Rysavy, Peter, "PCCA Standards Committee Passes Annex L", http://www.pcca.org/articles/annedl.html., (visited Feb. 1, 1998.).

"RAM Mobile Data and Ericsson have teamed up for NDIS Driver Development", Portable Computer and Communications Association, http://www.pcca.org/articles/cancell/html, (visited Feb. 1, 1998.).

"WRQ White Papers and Technology Updates", http://www.wrq.com/wpindex.htm., (visited Feb. 1, 1998.).

"How WRQ's TCP/IP Reduces Costs and Improves Reliability in Remote and Mobile Computing", http://www.wrq.com/whitepap/remote1/remote1.htm., (visited Feb. 1, 1998.).

"TCP/IP: The Best Protocol for Remote Computing", 1996, http://www.wrq.com/whitepap/remote2/remote2.htm, (visited Feb. 1, 1998.).

"Narrowband Sockets", News Specification Software, Intel Corp., 1998, http://www.intel.com/ial/nbs, (visited Feb. 1, 1998.).

"Press Releases", News Specification Software, Intel Corp., 1998, http://www.intel.com/ial/nbs/I–n, (visited Feb. 1, 1998.).

"Intel and Nokia Extend Internet with Open Short Messaging Technology," 1996, http://www.intel.com/ial/nbs/I–n__nbs.htm, (visited Feb. 1, 1998.).

Tso, Mike, "Enabling AOAC Mobile Computing with Narrowband Sockets", Intel Corporation, 14 pages, 1996.

News Specification Software, "Specification", Intel Corporation, 1998, http://www.intel.com/ial/nbs/spec_ 10.htm, (visited Feb. 1, 1998.).

"Narrowband Sockets Specification", Intel Corp./Nokia, Revision 1.0, Mar. 1997, (visited Feb. 1, 1998.).

Raj Yavatkar & Namrata Bhagawat, *Improving End–to–End Performance of TCP Over Mobile Internetworks*, Workshop on Mobile Computing Systems and Applications, Dec. 8–9, 1994, Mobile Computing Systems and Applications—Workshop Proceedings, p. 146–152 (1995).

R. Caceres & L. Iftode, *The Effects of Mobility on Reliable Transport Protocols*, 14$^{th}$ Int. Conf. On Distributed Computing Systems, Jun. 21–24, 1994, p. 12–20 (1994).

K. Cho & K.P. Kirmans, *A Group Communication Approach for Mobile Computing*, Workshop on Mobile Computing Systems and Applications, Dec. 8–9, 1994, p. 95–102 (1995).

C. Partridge & R. Hinden, *Version 2 of the Reliable Data Protocol (RDP), Network Working Group: Request for Comments: 1151 (Updates RFC 908)*, Apr. 1990, (visited Apr. 6, 1998), http://www.roxen.com/rfc/rfc1151.html.

A. DeSimone, M.C. Chuah & O.C. Yue, *Throughput Performance of Transport—Layer Protocols Over Wirless LANs*, Globecom '93: Global Telecommunications Conference, New York, No. 1, p. 542–549.

R. Caceres & L. Iftode, *Improving the Performance of Reliable Transport Protocols in Mobile Computing Environments*, IEEE Journal on Selected Areas in Communications, vol. 13, No. 5, p. 850–7 (Jun. 1995).

T. Watson & B.N Bershad, *Local Area Mobile Computing on Stock Hardware and Mostly Stock Software*, Proc. Of the USENIX Mobile and Location–Independent Computing Symposium, Cambridge, MA, Aug. 2–3, 1993, p. 109–15 (1993).

Norman Adams et al., *An Infrared Network for Mobile Computers*, Proc. Of the USENIX Symposium on Mobile and Location–Independent Computing, Cambridge, MA, Aug. 1993, p. 41–52.

B.R. Badrinath et al., *Handling Mobile Clients: A Case for Indirect Interaction*, In Proc. of 4$^{th}$ Workshop on Workstation Operating Systems (WWOS–IV), Oct. 14–15, 1993.

A. Bakre & B.R. Badrinath, *Handoff and System Support for Indirect TCP/IP*, In Proc. Second Symposium on Mobile and Location–Independent Computing, USENIX, Apr. 1995, p. 11–24.

E. Amir et al., *Efficient TCP over Networks with Wireless Links*, In Proc.Fifth Workshop on Hot Topics in Operating Systems, IEEE, May 1995, p. 35–40.

Peter D. Skopp & Gail E. Kaiser, *Disconnected Operation in a Multi–User Software Development Environment*, IEEE Workshop on Advanced in Parallel and Distributed systems, Oct. 1993, p. 146–151.

My T. Le et al., *Software Architecture of the Infopad System*, In Proc. Modidata Workshop on Mobile and Wireless Information Systems, Rutgers University, New Brunswick, NJ, Oct. 1994, http://infopad.eecs.berklely.edu.:80/info...pers/1994/infopad_software_arch.mobidata/.

J. Ioannidis & G.Q. Maquire, Jr., *The Design and Implementation of Mobile Internetworking Architecture*, In Proc. 1993 Winter USENIX, USENIX, San Diego, Jan. 1993, pp. 491–502.

J. Ioannidis, Dan Duchamp & G.Q. Maguire, Jr., *IP–based Protocols for Mobile Internetworking*, SIGCOMM '91 Conference: Communications Architectures and Protocols, Association for Computing Machinery, Sep., 1991, p. 235–245.

F. Teraoka et al., *VIP: A Protocol Providing Host Mobility*, Communications of the ACM, vol. 37, No. 8, p. 67–75, 113 (Aug. 1994).

M. Bender et al., *Unix for Nomads: Making UNIX Support Mobile Computing*, Proc. of the UNIX Mobile & Location–Independent Computing Symposium, Aug. 2–3, 1993, Cambridge, MA, p. 53–67.

D. Duchamp & N.F. Reynolds, *Measured Performance of a Wireless LAN*, In Proc. of the 17$^{th}$ IEEE Conference on Local Computer Networks, Sep. 1992.

B.R. Badrinath et al., *Structuring Distributed Algorithms for Mobile Hosts*, 14$^{th}$ IEEE Intl. Conf. on Distributed Computing, Poznan, Poland, Jun. 1994.

A. Athan & D. Duchamp, *Agent–Mediated Message Passing for Constrained Environments*, Proc. Of the USENIX Mobile and Location–Independent Computing Symposium, Aug. 2–3, 1993, Cambridge, MA, p. 103–7.

K. Keeton et al., *Providing Connection–oreiented Network Services to Mobile Hosts*, Proc. of the USENIX Mobile and Location–Independent Computing Symposium, Aug. 2–3, 1993, Cambridge, MA, p. 83–102.

V. Jacobson, *Congestion Avoidance and Control*, SIGCOMM '88 Symposium: Communications Architectures and Protocols, Aug. 16–19, 1988, Computer Communication Review, vol. 18, No. 4, p. 314–29 (Aug. 1988).

T. Imielinski & B.R. Badrinath, *Mobile Wireless Computer: Challenges in Data Management*, Communications of the ACM, 37 (10), p. 18–28 (1994).

A. Bakre & B.R. Badrinath, *M–RPC: A Remote Procedure Call Service for Mobile Clients*, MOBICOM '95, Proc. of the First Annual International Conf. on Mobile Computing and Networking, Nov. 13–15, 1995, p. 97–110 (1995).

C.–K. Toh, *The Design of a Hybrid Handover Protocol for Multimedia Wireless LANs*, 2$^{nd}$ International Workshop on Mobile Multi–Media Communications, Apr. 11–13, 1995, p. A5/2/1–6 (1995).

K. Brown & S. Singh, *M–UDP: UDP for Mobile Cellular Networks*, Computer Communications Review, vol. 26, No. 5, p. 60–78 (Oct. 1996).

L.B. Huston & P. Honeyman, *Disconnected Operation for AFS*, Proc. of the USENIX Mobile and Location–Independent Computing Symposium, Aug. 2–3, 1993, Cambridge, MA, p. 1–10 (1993).

Stevens, W. Richard, *TCP/IP Illustrated*, vol. 1: "The Protocols," Addison–Wesley Professional Computing Series, 1994, pp. 1–51, 143–168, and 223–337.

PROVIDING RELIABLE COMMUNICATION OVER AN UNRELIABLE TRANSPORT LAYER IN A HAND-HELD DEVICE USING A PERSISTENT SESSION

TECHNICAL FIELD

The present invention relates generally to data processing systems and, more particularly, to providing reliable communication over an unreliable transport layer in a hand-held device using a persistent session.

BACKGROUND OF THE INVENTION

Conventional systems that perform data transfers typically use a protocol stack to facilitate the data transfer. A "protocol stack," also known as a protocol suite, contains a number of layers, with each layer responsible for a different facet of the data transfer. Each layer typically utilizes a protocol, which defines the types and formats of messages transferred by a layer to perform its facet of the data transfer.

A data transfer typically occurs between two end systems: the source of the data and the destination for the data. Often, the end systems are not directly connected, so the data transferred between the end systems must be routed through a number of intermediate systems. Each end system typically has the same protocol stack, although the intermediate systems need only a subset of the protocol stack that includes the layers necessary to perform the routing.

FIG. 1 depicts a protocol stack 100, known as the TCP/IP protocol stack, which has been used extensively by data transfer systems. For example, many systems on the Internet utilize a TCP/IP stack. One of the benefits of utilizing a TCP/IP stack is the ability to communicate in an easy, efficient, and standardized manner with many computers world wide. The TCP/IP protocol stack 100 comprises an application layer 102, a transport layer 104, a network layer 106, and a link layer 108. The application layer 102 performs the processing of a particular application. For example, the application layer 102 may provide file transfer functionality, electronic mail functionality, network management functionality, or remote log-in functionality. When performing one of these applications, the application layer 102 on one end system sends data to a corresponding application layer on another end system by passing the data to the transport layer 104.

The transport layer 104 receives data from the application layer 102 and facilitates the flow of this data between the application layers on the end systems. In the TCP/IP protocol stack 100, two different transport protocols are used: the transmission control protocol (TCP) and the user datagram protocol (UDP). TCP is a connection-oriented protocol that reliably transfers data between two end systems (a source and a destination). Before transferring data, the TCP layer on the source system establishes a connection with the TCP layer on the destination system, and the TCP layers send all of the packets to be transferred over this connection. As a result, TCP is known as a connection-oriented protocol. A connection-oriented protocol is one in which a connection is established before a data transfer occurs. A connection is established when the two ends of the connection have expressed an explicit willingness to take part in the data transfer. In a connection-oriented protocol, all data is transferred over a connection, and the connection is terminated after the data transfer has completed.

The data transfer performed by TCP is reliable because TCP guarantees that the data will be sent correctly to the destination end system. To provide such reliability, TCP (1) divides the data received from the application layer 102 into appropriately sized packets for the network layer 106, (2) acknowledges all packets received, (3) sets time-outs to ensure that the destination end system acknowledges that the packets were received, and (4) performs other functionality to ensure that when TCP receives data from the application layer 102, the corresponding TCP layer on the destination end system receives that data correctly. One drawback to TCP's reliable data transfer is, to perform this functionality, the size of the TCP layer is large, thus requiring a significant amount of memory.

In contrast to TCP, UDP is a much simpler service that provides unreliable data transfer. UDP is a connectionless protocol in which data is transferred in an unplanned fashion and without prior coordination. Upon receiving data from the application layer 102, UDP forms a packet, known as a datagram, and sends this packet to the network layer 106 for transfer to the end system in an unreliable manner: no acknowledgments are used and UDP does not guarantee that the datagrams reach the end system. UDP thus performs less functionality than TCP and, consequently, requires less memory.

The network layer 106, also known as the internet layer, receives packets from the transport layer 104 and performs the processing necessary to route these packets through the network. In the TCP/IP protocol stack 100, this layer utilizes one of three well-known protocols: the internet protocol (IP), the internet control message protocol (ICMP), or the internet group management protocol (IGMP).

The link layer 108, also known as the data-link layer or the network-interface layer, receives packets from the network layer 106 and performs the processing necessary to physically interface with the network transfer media, such as a cable, to transfer the packets across the network. To interface with the network transfer media, the link layer typically includes a network interface card and a suitable device driver that resides in the operating system.

The TCP/IP protocol stack 100 is utilized to transfer data within either a single network or within an internetwork ("internet"), which is a collection of networks using the same protocol stack. Each addressable entity, such as an application program, that can be accessed via the TCP/IP protocol stack has an associated IP address: the IP address is a 32-bit address specifying both a host ID (the ID of the computer on which the resource is located) and a network ID (the ID of the network on which the computer is located). IP addresses and, more generally, the TCP/IP protocol stack 100 is described in greater detail in Stevens, TCP/IP Illustrated Volume 1, Addison Wesley (1994), at pages 1–51, 143–168, and 223–337.

Although the TCP/IP protocol stack facilitates communication between systems, some systems are unable to utilize the TCP/IP stack and are thus unable to reap the benefits of efficiently communicating with numerous systems and devices in a standardized manner with relative simplicity. For example, hand-held devices, devices that can both be easily held and manipulated using one or two hands, have been developed for reading bar codes. These devices receive bar-code information and transmit it to a host computer via radio communications. Such devices can greatly benefit from using a TCP/IP protocol stack to facilitate communications to the host and other computers in a standardized manner using standard components. However, these devices have an extremely limited amount of memory. When selecting a transport layer for such a device, the TCP layer cannot be used because it is too large, thus requiring an unacceptable amount of memory. Likewise, the UDP layer cannot be utilized, because it provides unreliable communication, and the application on the hand-held device typically lacks the sophistication necessary to identify which datagrams have not been received, to keep track of these datagrams, and then to retransmit them when necessary. It is thus desirable to overcome these problems and to incorporate a TCP/IP protocol stack into a hand-held device.

Another problem that needs to be addressed in a communications system for a hand-held device is faulty communications. When a user utilizes a hand-held device, the user typically encounters interference, moves out of range, or performs some other action that disrupts communications, which causes a connection to terminate. Conventional connection-oriented protocol stacks, however, are not suitable for such an environment, because these protocol stacks require that an application program both maintain a copy of the data (i.e., packets) to be transferred in case the connection terminates and identify which packets were not transferred before the connection terminated. Having to perform this functionality increases the amount of memory needed by the application program as well as its complexity. When a connection terminates, conventional connection-oriented protocol stacks discard information associated with the connection, including both the packets that were to be transferred before the connection terminated as well as various context information, which is information associated with the connection, like an identifier of the destination, sequence numbers for the packets being transferred, and an indication of which packets were successfully transferred. As a result, when a connection terminates, the application program must identify which packets were not transferred before the connection terminated and must provide the protocol stack with these packets, so that the packets can be transferred.

To better illustrate this problem, FIG. 2 depicts a flowchart of the steps performed when a conventional, connection-oriented protocol layer (TCP) sends data between an application program on a source device and an application program on a destination device. The processing of both the source device and the destination device in this flowchart is depicted chronologically. The first step performed is that the application program on the source device provides a number of packets (e.g., A, B, C) to the TCP layer (step 202). After receiving these packets, the TCP layer sends packet A to the destination device (step 204). The TCP layer on the destination device, then receives packet A and responds by sending an acknowledgment to the TCP layer on the source device (step 206). After the TCP layer on the destination device sends the acknowledgment, the TCP layer on the source device receives the acknowledgment (step 207). Sometime after the TCP layer on the source device receives the acknowledgment, the connection terminates or disconnects (steps 208 and 210). A disconnect may occur, for example, when either the TCP layer on the source device or the TCP layer on the destination device explicitly requests a disconnect or if a communications error disrupts communications for more than a predetermined amount of time.

When the TCP layer on both the source device and the destination device determine that a disconnect occurred, the TCP layers discard all information associated with the connection and return an indication of the disconnect to their respective application program (steps 212 and 213). In these steps, for example, the TCP layer on the source device discards packets B and C and any indication that packet A was transferred successfully. Therefore, the application program on the source device must restart the data transfer by invoking the TCP layer on the source device and by passing packets B and C to the TCP layer (step 214). For the application program on the source device to be able to perform this functionality, the application program must have retained a copy of packets B and C after these packets were passed to the TCP layer in step 202, and the application program must keep track of which packets were transferred successfully. When the application program maintains a copy of a packet after the TCP layer receives a copy of the packet, the source device contains two copies of the same data. Maintaining two copies of data is sometimes referred to as double buffering. Although double buffering increases memory utilization, it does not typically pose a problem in larger computers; it does, however, pose a problem in smaller devices having limited memory, such as hand-held devices. Also, because the application program must keep track of which packets were transferred successfully, the complexity of the application program is increased. As a result of these drawbacks, it is desirable to improve communications in hand-held devices.

SUMMARY OF THE INVENTION

The disclosed system provides a UDP+ connection-oriented protocol layer that reliably communicates over the UDP transport layer in a hand-held device. By providing reliable communication over the UDP transport layer instead of using the TCP transport layer, memory requirements are reduced, and applications running on the hand-held device have reliable data transfers performed on their behalf. Additionally, the UDP+ layer is designed to communicate using a "persistent session." A persistent session is a mode of communication where, when a connection terminates, the data associated with the connection, including the packets that have not yet been transferred, is not discarded. Instead, in using a persistent session, UDP+ retains the data associated with a connection after it terminates, reestablishes the connection, and completes the data transfer. By performing such a persistent session, application programs using UDP+ do not need to retain a copy of the packets passed to UDP+, and the code of the application programs is simplified, because the application programs do not need to keep track of which packets were successfully transferred when the connection terminates.

Under a first embodiment of the present invention, a method is provided in a data processing system for transferring data between a source computer and a destination computer via a communication mechanism. The source computer and the destination computer each have an application program and a connection-oriented protocol stack for transferring the data between the application program on the source computer and the application program on the destination computer. The connection-oriented protocol stack on the source computer establishes a connection with the connection-oriented protocol stack on the destination computer and receives data from the application program on the source computer. The received data is to be transferred to the application program on the destination computer. The connection-oriented protocol stack on the source computer sends at least one message containing a portion of the received data to the connection-oriented protocol stack of the destination computer and determines that the connection has terminated after sending the at least one message. Additionally, the connection-oriented protocol stack on the source computer reestablishes the connection and completes the data transfer by sending to the connection-oriented protocol stack on the destination computer a plurality of messages containing remaining portions of the received data that have not already been sent to the protocol stack on the destination computer.

Under a second embodiment of the present invention, a method is provided in a data processing system for transferring data between a source program and a destination program using a source communication mechanism and a destination communication mechanism. The source computer program receives data for transfer to the destination program and provides the received data to the source communication mechanism. The source communication mechanism establishes a connection to the destination communication mechanism and completely transfers the received data to the destination communication mechanism even though the connection is terminated at least once while the data is being transferred.

Under a third embodiment of the present invention, a client device for transferring data to a server device via wireless communications is provided. The client device includes a wireless communications subsystem for transferring the data to the server device, a memory, and a processor. The memory contains an application program for transferring the data to the server device, a connection-oriented communication mechanism, and a transport layer. The connection-oriented communication mechanism receives the data from the application program and establishes a persistent session with the server device such that the received data is completely transferred to the server device over a plurality of connections with the server device during the persistent session. The transport layer transfers the data to the server device via the wireless communications subsystem. The processor runs the application program, the connection-oriented communication mechanism, and the transport layer.

DETAILED DESCRIPTION OF THE INVENTION

Figure 1:
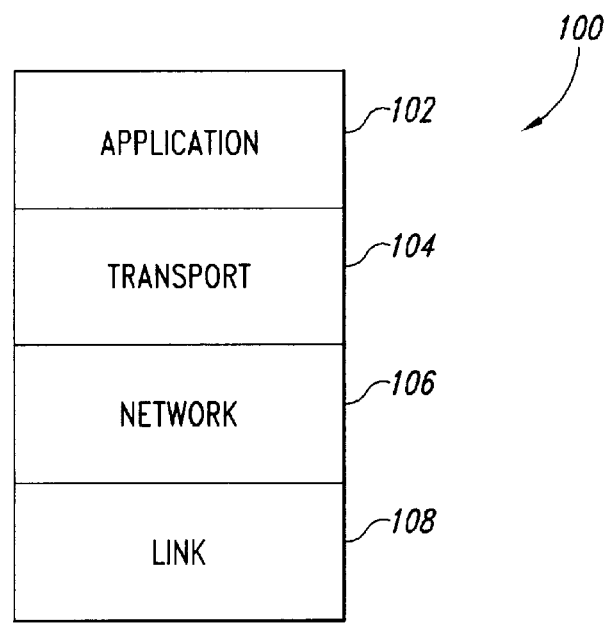
FIG. 1 depicts a conventional TCP/IP protocol stack.

An exemplary embodiment of the present invention provides reliable communication over the UDP transport layer in a hand-held device. By providing reliable communication over the UDP transport layer instead of using the TCP transport layer, memory requirements are reduced, and applications running on the hand-held device have reliable data transfers performed on their behalf. Additionally, the use of standardized components, such as the UDP transport layer and a standard network layer like the IP layer, enables the hand-held device to efficiently communicate with many other devices in a standardized manner.

An exemplary embodiment provides reliable communication by utilizing a UDP+ layer on top of the UDP transport layer. The UDP+ layer acts as an interface between the application layer and the UDP layer both to provide reliable communication to the application layer and to hide the complexities involved with performing this functionality from the application layer. To provide reliable communication, the UDP+ layer is a connection-oriented protocol layer that acknowledges all messages received, and the UDP+ layer utilizes a retry timer such that when receipt of a message has not been acknowledged and the retry timer expires, the UDP+ layer resends the message. Also, the UDP+ layer utilizes a number of messages that are used to open a connection, transfer data, and close a connection. The format of the messages and their use are further described below.

The UDP+ layer of an exemplary embodiment is designed to communicate using a "persistent session." In the data communications field, the terms "connection" and "session" are typically used as synonyms. An exemplary embodiment, however, introduces the concept of a persistent session where, after a connection is terminated, the data associated with that connection is not discarded; rather, an exemplary embodiment retains this data, reestablishes a connection, and completes the data transfer. By using such a persistent session, application programs interacting with the UDP+ layer do not need to retain a copy of the packets passed to the UDP+ layer, thus alleviating the problem of double buffering. In addition, the implementation of application programs that utilize the UDP+ layer is simplified, because these application programs do not need to keep track of which packets were successfully transferred when a connection terminates. That is, regardless of how many times a connection terminates, the UDP+ layer of an exemplary embodiment ensures that the data will be transferred until the persistent session ends. In an exemplary embodiment, a "persistent session" occurs between the power up of the hand-held device (or the corresponding end system to which it communicates) and the power down of the hand-held device (or the corresponding end system). Alternatively, a user may issue a reset command to terminate a persistent session.

To provide a thorough understanding of the present invention, the following description sets forth numerous specific details, such as particular messages and fields within messages. One skilled in the art, however, will recognize that the present invention can be practiced without the specific details, or with other messages or fields within messages. In other instances, well-known structures and methods are not described in detail to avoid obscuring the present invention.

Figure 3:
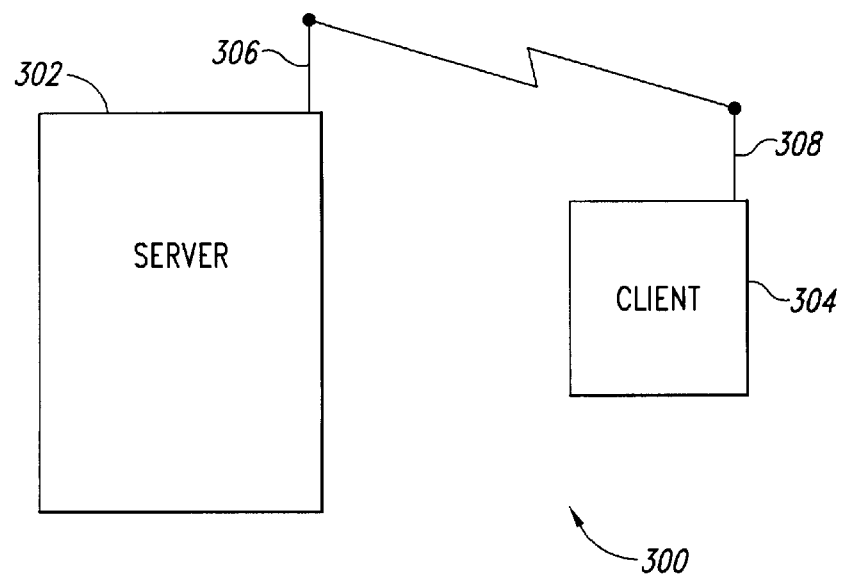
FIG. 3 depicts a data processing system suitable for practicing an exemplary embodiment of the present invention.
Figure 2:
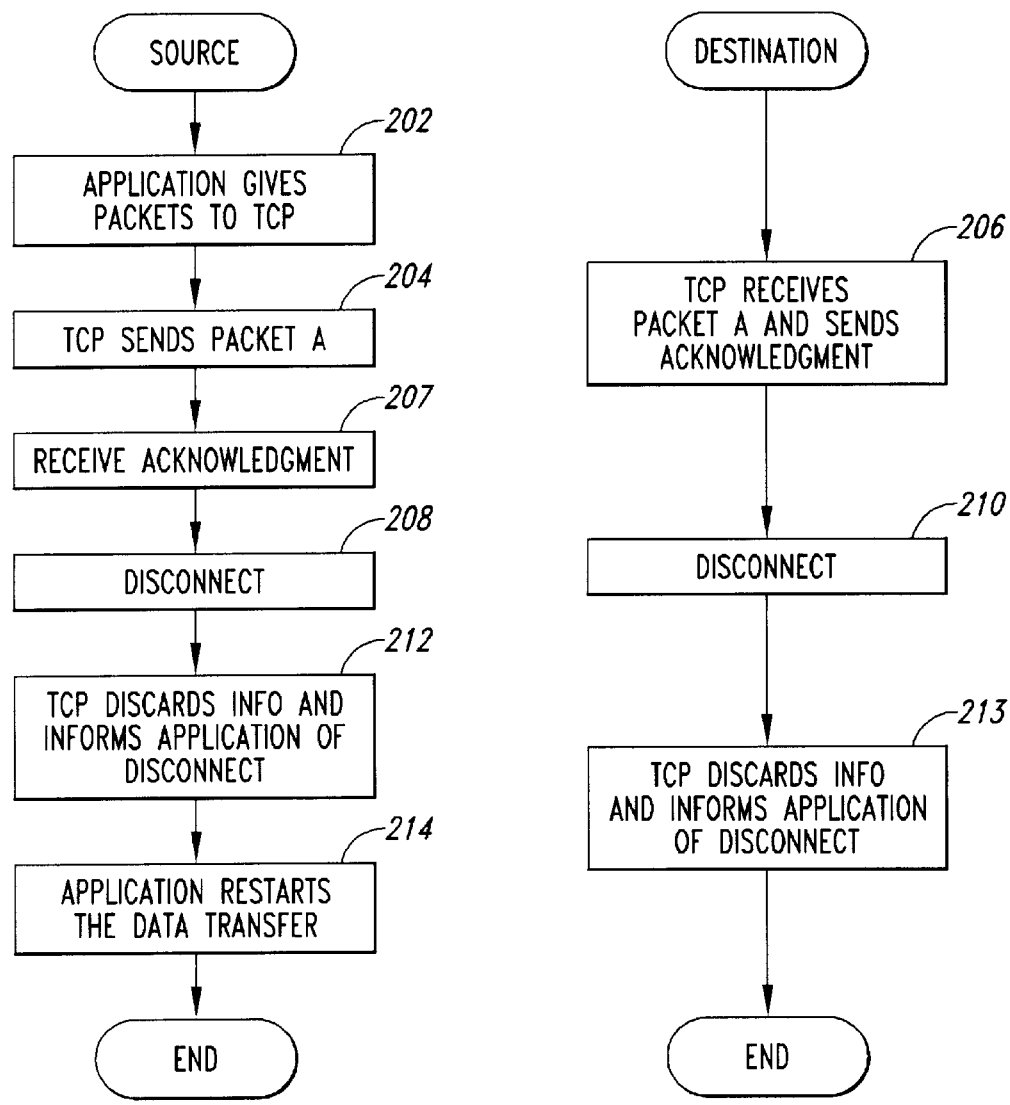
FIG. 2 depicts a flowchart of a conventional TCP layer transferring data.

FIG. 3 depicts a data processing system 300 that is suitable for practicing an exemplary embodiment of the present invention. The data processing system 300 contains a server computer 302 ("server") and a client hand-held device 404 ("client") that are communicating using radio frequency or other wireless communications via antennae 306 and 308, respectively. In an exemplary embodiment, the client 304 is a bar-code reader that reads or receives bar-code information and then transmits the bar-code information to the server 302. However, one skilled in the art will appreciate that the present invention can be utilized with other systems communicating via wireless communications.

Figure 4:
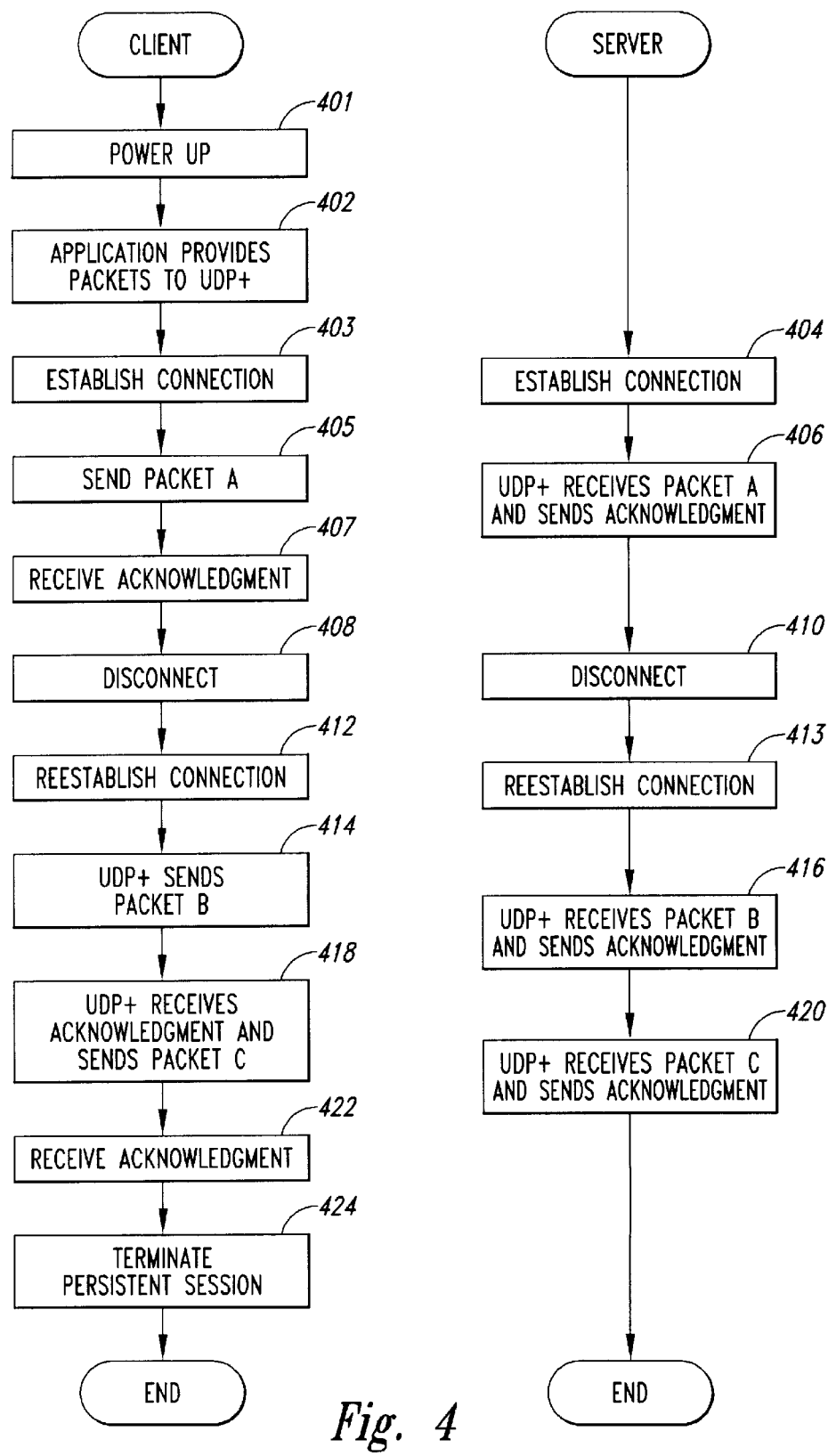
FIG. 4 depicts a flowchart of a data transfer performed by an exemplary embodiment.

FIG. 4 depicts a flowchart of the steps performed by an exemplary embodiment of the present invention when transferring data between the server 302 and the client 304. Initially, the persistent session begins by the client 304 being powered up (step 401). Subsequently, an application program on the client 304 provides a number of packets (e.g., A, B, C) to the UDP+ layer on the client 304 (step 402). After receiving the data, the UDP+ layer establishes a connection with the UDP+ layer on the server 302 (steps 403 and 404). As will be further described below, an exemplary embodiment establishes a connection by exchanging various messages. After establishing the connection, the UDP+ layer on the client 304 sends packet A to the UDP+ layer on the server 302 (step 405), and the UDP+ layer on the server 302 receives packet A and sends to the UDP+ layer on the client 304 an acknowledgment indicating that packet A has been received successfully (step 406). The UDP+ layer on the client 304 then receives the acknowledgment (step 407). Sometime after the UDP+ layer on the client 304 receives the acknowledgment, the connection terminates (steps 408 and 410).

Upon determining that the connection terminated, unlike conventional systems, the UDP+ layer on both the client 304 and the server 302 do not discard all of the data pertaining to the connection; instead, the UDP+ layers retain the information and reestablish a connection (steps 412 and 413). In this step, the UDP+ layers retain all context information and the UDP+ layer on the client 304 retains packets B and C. After reestablishing the connection, the UDP+ layer on the client 304 sends packet B to the UDP+ layer on the server 302 (step 414), and the UDP+ layer on the server 302 receives packet B and sends an acknowledgment to the UDP+ layer on the client 304 (step 416). After sending the acknowledgment, the UDP+ layer on the client 304 receives the acknowledgment and sends packet C to the UDP+ layer on the sever 302 (step 418). Next, the UDP+ layer on the server 302 receives packet C and sends an acknowledgment to the UDP+ layer on the client 304 (step 420). The client 304 then receives the acknowledgment and the data transfer is complete (step 422). Eventually, the persistent session terminates (step 424). In this step, the user powers down the client 304. Alternatively, however, the user may power down the server 302 or the user may issue a reset command at either the client 304 or the server 302.

Figures 5, 6:
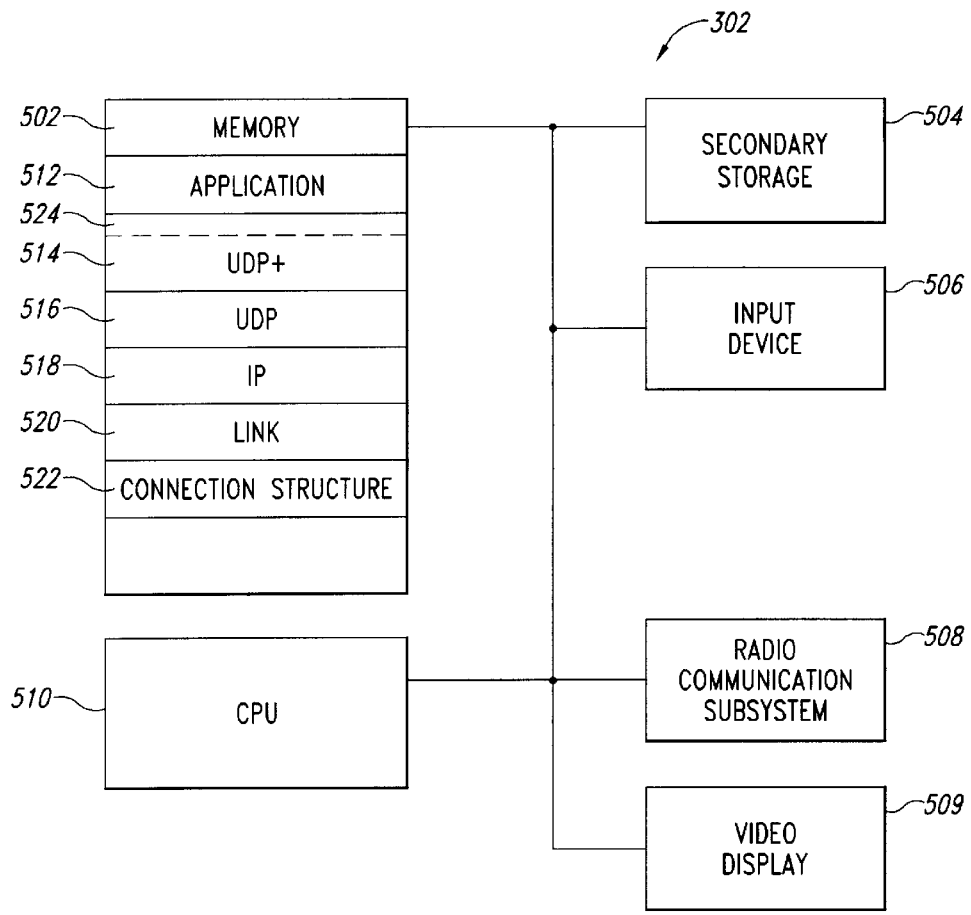
FIG. 5 depicts a more detailed diagram of a server computer of FIG. 3.
FIG. 6 depicts a more detailed diagram of a connection structure of the server computer of FIG. 5.

FIG. 5 depicts a more detailed diagram of the server 302. The server 302 contains a memory 502, a secondary storage device 504, an input device 506, a radio communication subsystem 508, a video display 509, and a central processing unit (CPU) 510. The memory 502 contains an application program 512, a UDP+ layer 514, a UDP transport layer 516, an IP network layer 518, a link layer 520, and a connection structure 522. The application program 512 receives bar-code information from the client 304 and stores the bar-code information onto or within the secondary storage device 504, so that this information can then be used for generating reports, such as an inventory report of the types and numbers of inventory items located in a remote warehouse. The UDP+ layer 514 provides reliable communication over the UDP layer 516, and the UDP+ layer provides an interface 524 to the application program 512, so the application program can determine the connection status of a particular client (ie., whether the client is connected or disconnected).

To perform this processing, the UDP+ layer 514 utilizes a connection structure 522 that stores connection-related information for the clients with which it communicates. The UDP layer 516 is a standard UDP layer and conforms with Request for Comments (RFC) 768, J. Postel, "User Datagram Protocol," 1980. Similarly, the IP layer 518 is a standard IP layer and conforms to RFC 791, J. Postel, "Internet Protocol," 1981. The link layer 520 provides suitable functionality to interface with the hardware components of the radio communication subsystem 508. The radio communication subsystem 508 includes an antenna 306 and network interface hardware components that facilitate communication via radio frequencies to the client 304. Alternatively, the server 302 may utilize an Ethernet connection to an Ethernet/radio frequency bridge which is external to the server.

Although an exemplary embodiment is described as using the UDP and IP layers, one skilled in the art will appreciate that the present invention can be used with other transport and network layer protocols, including the NetBEUI transport protocol available from Microsoft Corporation of Redmond, Wash., the internet packet exchange (IPX) network layer protocol available from Novell Corp. of Provo, Utah, or the connectionless network protocol (CLNP) defined in ISO 8473 by the International Standards Organization.

The connection structure 522, as depicted in FIG. 6, contains a number of entries, including entries 602 and 604. Each entry 602 and 604 contains connection-related information (or context information) for an application program ("client application") on the client that communicates with the server. Each entry 602 and 604 contains the IP address 606 of the client application, the session number 608, an Rx value 610, a Tx value 612, a data pointer 614, an application ID 616, and a client state indication 618. The IP address 606, whose structure is well known, is a 32-bit address uniquely identifying the network address of the client application (e.g., 192.9.200.10). The session number 608 is a number assigned by the UDP+ layer to identify a communication session between the server and a particular client application (e.g., 55).

The Rx value 610 contains the message or sequence number for the next message that the UDP+ layer expects (e.g., 11). Each message transferred between the client and the server by the UDP+ layer has an associated, sequential message number. The Rx value 610 indicates the message number of the last message that the UDP+ layer acknowledged receiving plus one. In other words, the Rx value 610 indicates the next message number that the UDP+ layer expects to receive from the client. The Tx value 612 indicates the number of the most recent message received from the client (e.g, 10). The data pointer 614 is an address to a memory location containing the next amount of data to be transferred to the client (e.g., 507). For instance, when the server transfers a series of data messages to the client, this pointer refers to the data for the next message to be sent. The application ID 616 is an identifier of the particular application utilizing the UDP+ layer. For example, the application utilized by an exemplary embodiment is a bar-code scanner application used for inventory.

The client state field 618 indicates whether the client is connected to, disconnected from, or not responding to the server. A client 304 is "connected" when the UDP+ layer of the client and UDP+ layer of the server have both indicated a willingness or intention to be involved in a data transfer. Establishing a connection is a necessary prerequisite for UDP+ to perform a data transfer; as such, UDP+ provides a connection-oriented protocol. A client is "not responding" when the server's UDP+ layer has sent a given message to the client a predetermined number of times (e.g., 7) requesting an acknowledgment and, each time, an acknowledgment was not received. After either the client UDP+ layer or the server UDP+ layer sends a message without receiving an acknowledgment, the message is resent upon the expiration of a retry timer, which is initially set to a configurable, predetermined value ranging between 300 milliseconds and 60 seconds. Each time that the retry timer expires and a message is resent, the retry timer value increases by approximately 40%, but never exceeds a ceiling of 60 seconds. The server UDP+ layer considers the client to be not responding when the server UDP+ layer has sent the message to the client 7 times without receiving an acknowledgment. The server UDP+ layer may not receive an acknowledgment because of faulty communications.

A client can be "disconnected" either explicitly or implicitly. For an explicit disconnection, the server UDP+ layer and the client UDP+ layer exchange messages indicating their intention to terminate the connection. An implicit disconnect occurs when the server UDP+ layer has not received a message for more than a predetermined amount of time ranging between 1 and 3,600 minutes. The server UDP+ layer determines when such a time has expired by setting a dead horse timer, and when this timer expires without receiving a message from the client UDP+ layer, the server UDP+ layer changes the client's connection status to disconnected.

Figure 7:
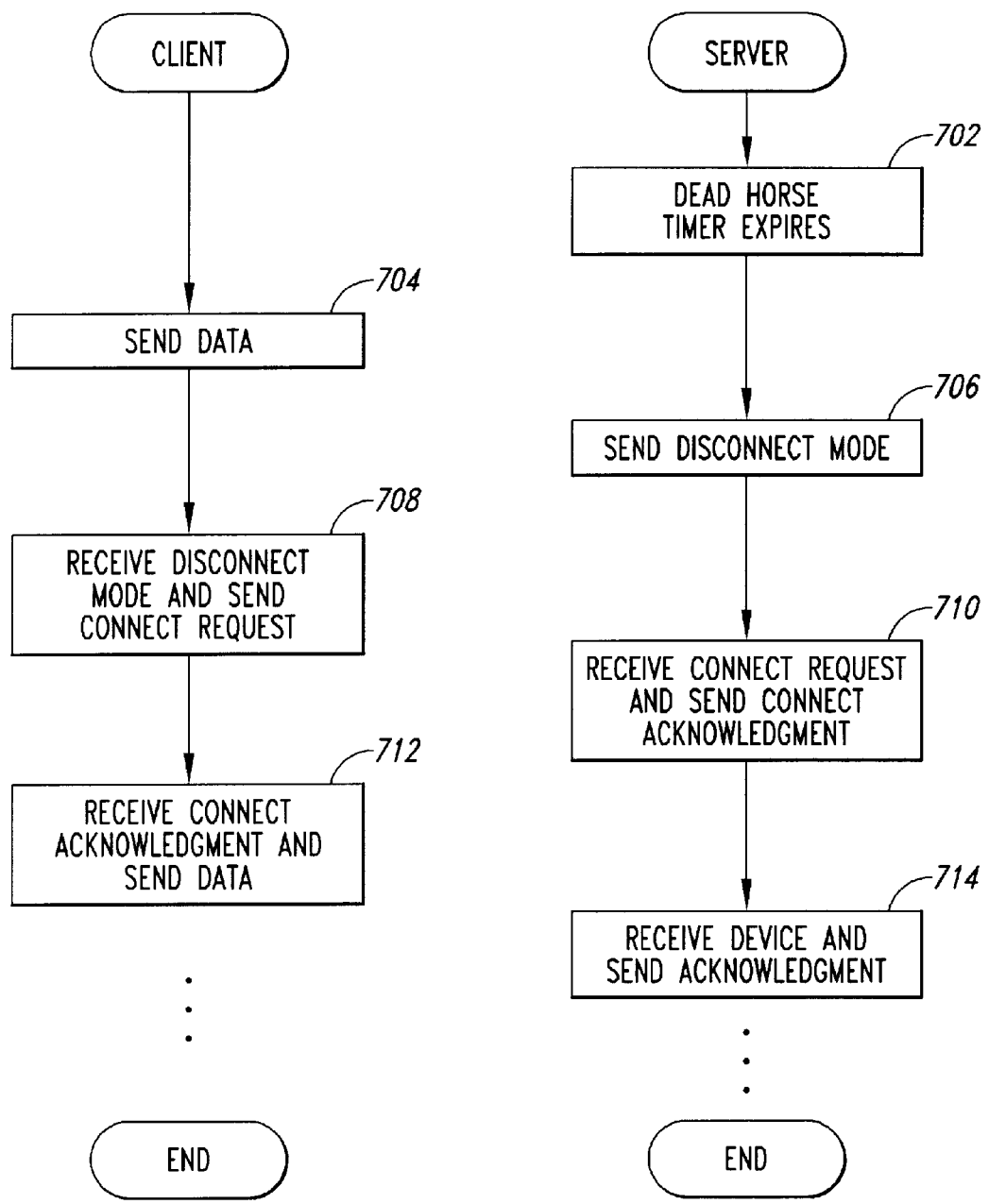
FIG. 7 depicts a flowchart of the steps performed when an implicit disconnect occurs between the client and the server of FIG. 3.

FIG. 7 depicts a flowchart of exemplary steps performed by the client 304 and the server 302 during an implicit disconnect. During a persistent session between the client 304 and the server 302, the server may have an acknowledgment outstanding which has been outstanding for more than the period of time predesignated by the dead horse timer. In this situation, the dead horse timer expires (step 702). Some time later, the client 304 may either send data to the server 302 or the acknowledgment that is outstanding (step 704). In response to receiving this data, the server 302 sends a message indicating that it has disconnected from the client 304 (step 706). This message is known as the disconnect mode message and is further described below. The client 304 receives the disconnect mode message and sends a connect request message to the server 302 (step 708). In this step, the client 304 sends the connect request message to reestablish a connection. In the connect request message, the client 304 sends its locally stored Rx value and Tx value to synchronize message sequence numbers with the server 302. The connect request message may alternatively indicate that the sequence numbers should be initialized to zero. The server 302 receives the connect request message and sends a connect acknowledgment to the client 304 (step 710). The connect acknowledgment contains the Rx value and the Tx value indicating to the client 304 the next message that should be sent. The client 304 receives the connect acknowledgment and sends the data corresponding to the packet having the next message sequence number to the server 302 (step 712). The server 302 receives the data and sends an acknowledgment to the client 304 (step 714). At this point, the client 304 and the server 302 continue to exchange data and acknowledgments until the data transfer is complete or until the persistent session ends.

Figure 8:
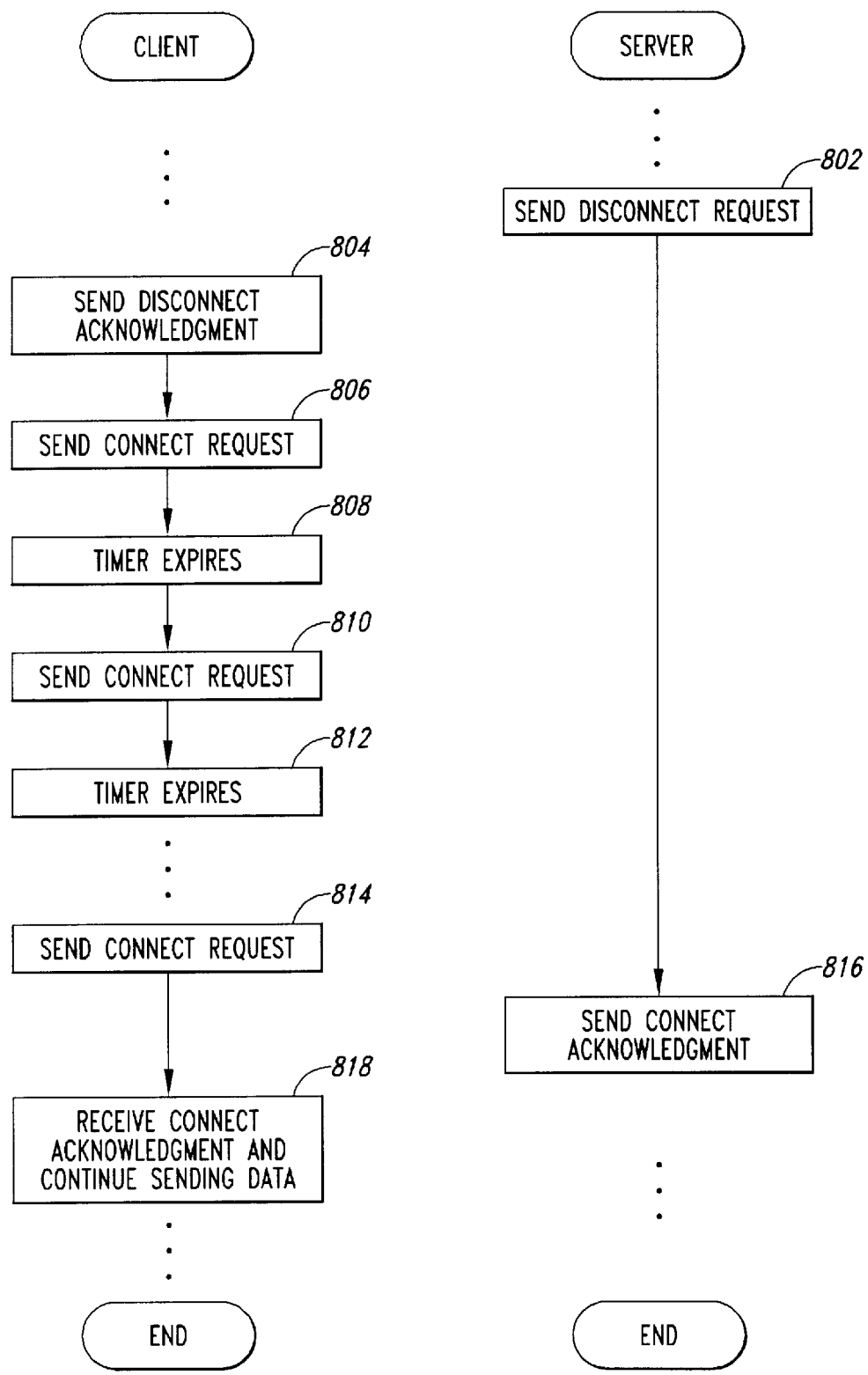
FIG. 8 depicts a flowchart of the steps performed when an explicit disconnect occurs between the client and the server of FIG. 3.

FIG. 8 depicts a flowchart of exemplary steps performed when the client 304 and server 302 perform an explicit disconnect. At some point during a persistent session, the server 302 sends a disconnect request to the client 304 (step 802). The client 304 receives the disconnect request and sends a disconnect acknowledgment to the server 302 (step 804). After sending the disconnect acknowledgment, the client 304 and the server 302 are disconnected and cannot transfer data. However, in this example, the client 304 has additional data to transfer to the server 302, so it sends a connect request (step 806). Upon sending the connect request, the client 304 sets the retry timer so that if an acknowledgment to the connect request is not received before the retry timer expires, the connect request is sent again. In this example, the server 302 is unwilling to engage in a connection and thus does not respond. Eventually, the retry timer expires (step 808) and the client 304 sends the connect request again (step 810). In this step, the client 304 resets the retry timer to a new value. The calculation of the value of the retry timer and updating its value is described in greater detail in copending U.S. patent application Ser. No. 08/852,002, entitled "Reliable Communication Over an Unreliable Transport Layer in a Hand-Held Device Using User-Configurable Timers," assigned to a common assignee and filed on even date herewith, still pending. After sending the connect request, the client 304 does not receive a connect acknowledgment and therefore the timer expires (step 812). This process continues until, at some later point, when the server 302 is available to take part in the connection, the client 304 sends the connect request (step 814) and the server responds by sending a connect acknowledgment (step 816). The client 304 receives the connect acknowledgment and continues sending the data to complete the data transfer (step 818).

Figure 9:
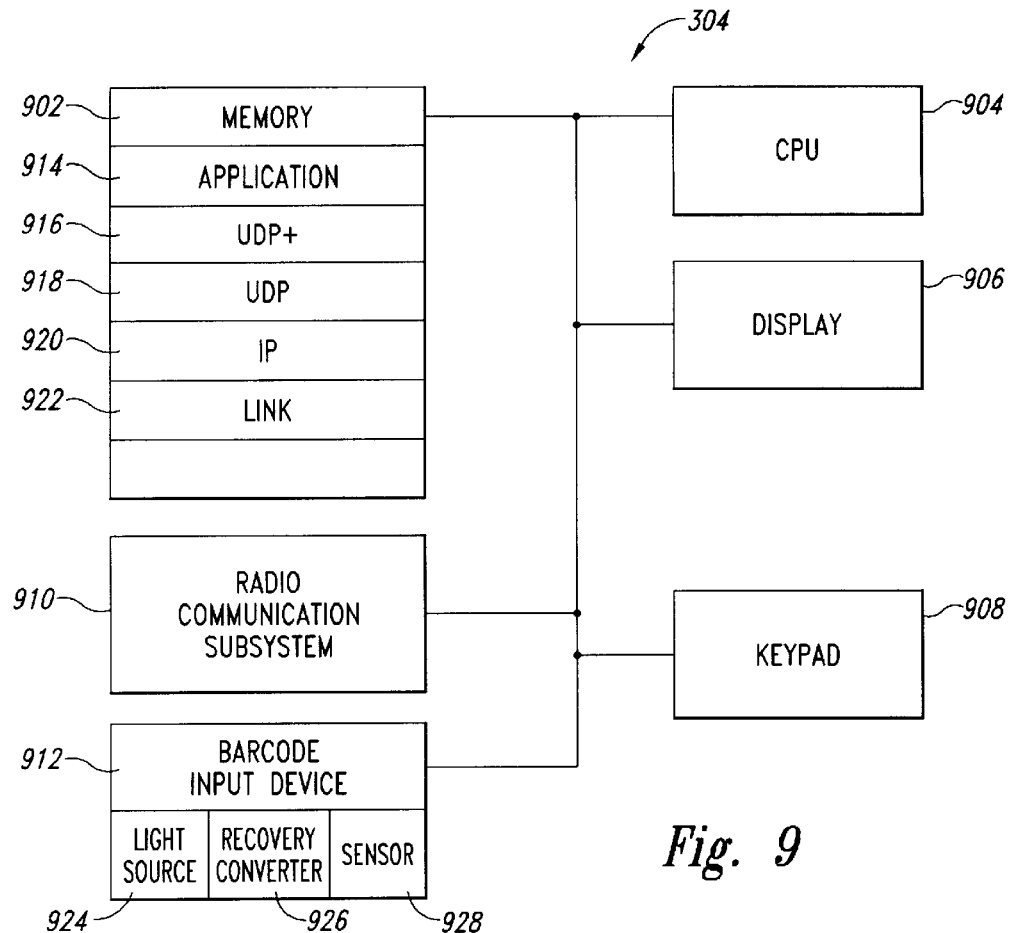
FIG. 9 depicts a more detailed diagram of a client computer of FIG. 3.

FIG. 9 depicts a more detailed diagram of the client 304. In an exemplary embodiment, the client 304 is a hand-held bar-code scanner containing a memory 902, a CPU 904, a display 906, a keypad input device 908, a radio communication subsystem 910 similar to that described relative to FIG. 5, and a bar-code input device 912. The memory 902 contains an application program 914 for reading bar-code data from inventory items and for sending this data to the server 302, a UDP+ layer 916, a UDP layer 918, an IP layer 920, and a link layer 922. The UDP+ layer 916 provides reliable communication over the UDP layer 918. The UDP layer 918, the IP layer 920, and the link layer 922 perform similar functionality to their respective counterparts as described relative to FIG. 5.

The bar-code input device 912 reads bar codes and contains a light source 924, a receiver/converter 926, and a sensor 928. The sensor 928 receives the light reflected from a bar code and converts this light into an electrical signal. For example, the light source 924 may be a laser, while the sensor 928 may be a photodetector. Alternatively, the light source 924 may be an LED, flashbulb, infrared light source, or other light-emitting element, while the sensor 928 may be a CCD, semiconductor array, vidicon, or other area imager capable of converting received light into electrical signals. The receiver/converter 926 receives the electrical signal from the sensor 928 and converts it into a signal to be processed by the CPU 904. Typically, the sensor 928 produces an analog signal that represents the modulated light reflected from the elements in the bar code. A bar-code input device suitable for use with the client 304 is more clearly described in U.S. Pat. No. 5,486,689, entitled "Method and Apparatus for Decoding Unresolved Multi-Width Bar Code Symbology Profiles," issued Jan. 23, 1996, and assigned to a common assignee. Although a suitable bar-code input device has been described, one skilled in the art will appreciate that other bar-code or data collection symbol input devices may be used.

Figure 10A:
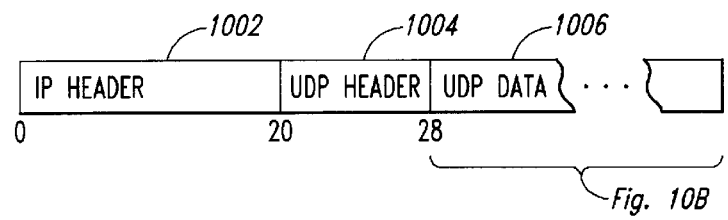
FIG. 10A depicts a format of a UDP message.

The UDP+ layers of both the client and server utilize a protocol that provides reliable communications over an unreliable UDP layer. This protocol specifies particular types and formats of messages, which are stored in a UDP packet and passed to the UDP layer for transfer. FIG. 10A shows the standard protocol data packet layout for a UDP 1000 packet as defined by RFC 1168. This packet 1000 contains a 20-byte, well-known IP header 1002, an 8-byte, well-known UDP header 1004, and variable-length UDP data 1006. The messages transferred by the UDP+ layers specify a format for the UDP data 1006 as shown in FIG. 10B.

Figure 10B:
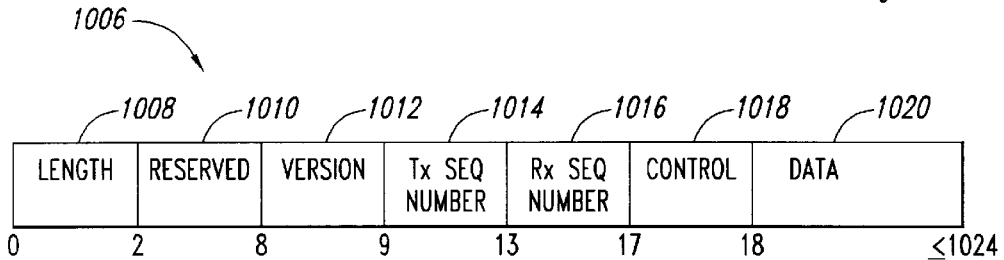
FIG. 10B depicts a message format utilized by UDP+ layers of both the client and the server depicted in FIGS. 5 and 9.

The UDP+ message format for the UDP data 1006 has a number of fields as shown in FIG. 10B, including a 2-byte length field 1008 indicating the entire length of the UDP+ data 1006, a 6-byte reserved field 1010, a 1-byte version identifier 1012 indicating the version of UDP+ that both the client and server are utilizing, a Tx field or value 1014 indicating the message number of the message, an Rx field or value 1016 indicating the next message number that either the client UDP+ layer or the server UDP+ layer is expecting, a 1-byte control field 1018 indicating the particular type of message, and a variable length data field 1020 used for transmitting data in the messages. The data field 1020 may include any data to be transferred, such as bar code information. The message format of the UDP data 1006 is a generic format utilized by the UDP+ layer of an exemplary embodiment for all the different types of messages.

As previously stated, the control field 1018 of the UDP data 1006 differs depending upon the type of message transferred. There are ten messages utilized by the UDP+ layer of an exemplary embodiment, although one skilled in the art will appreciate that additional or different messages can be used. The below table describes each of the various messages.

| Message Type | Control Value | Description |
| --- | --- | --- |
| connect request | 0x03 | A connect request is sent by either the server or client ("requester") to initiate a connection. The data portion 1020 of the message has a couple of predefined fields. One field is a 1-byte initialize field indicating that the requester wishes to initialize the message numbers. If this field is set to true, the message numbers are initialized to zero. Otherwise, the message numbers will continue from the value as of the last connection. A second field defined is the option list field, which is used to specify the message size that is transferred between the client and the server. |
| connect response | 0x04 | Upon receiving a connect request, a connect response is utilized to acknowledge the connection request, thus establishing a connection. |
| Iframe | 0x00 | An Iframe message is a data message transferred between the client and the server requesting an acknowledgment to provide guaranteed delivery. In this message, the Tx field 1014 contains the appropriate message number, and the data field 1020 contains the data for the message. |
| IAck | 0x01 | The IAck message is an acknowledgment sent by either the client or the server to acknowledge the correct receipt of an Iframe message. The Rx field 1016 contains the next message number that the acknowledger expects. |
| Uframe | 0x02 | A Uframe message is an unnumbered data message for nonguaranteed delivery. The Tx field 1014 and the Rx field 1016 are not used for this message type. |
| disconnect mode | 0x0a | A disconnect mode message is sent by either the client or server to notify the remote system that the local system has disconnected. For example, this message may indicate that the local system is being powered down. |

-continued

| Message Type | Control Value | Description |
| --- | --- | --- |
| watchdog request | 0x08 | The watchdog request is used to keep a connection alive when the client is not transferring data. If a client has not sent data for more than a predetermined amount of time, the client sends a watchdog request to the server to indicate that the client does not have any data to send at this time and has not, for some reason, disconnected. In other words, the receipt of this message indicates that the reason why the server has not received any data is because there was no data to be sent, not because of a communication problem. |
| watchdog response | 0x09 | The watchdog response is sent by the server in response to receiving a watchdog request. This response indicates that the server has received the watchdog message and will keep the client's connection alive. |
| disconnect request | 0x05 | The client or server sends a disconnect request to request that the connection be terminated. |
| disconnect response | 0x06 | The client or server sends a disconnect response to acknowledge the disconnect request and to indicate that, thereafter, the connection is terminated. |

Figure 11A:
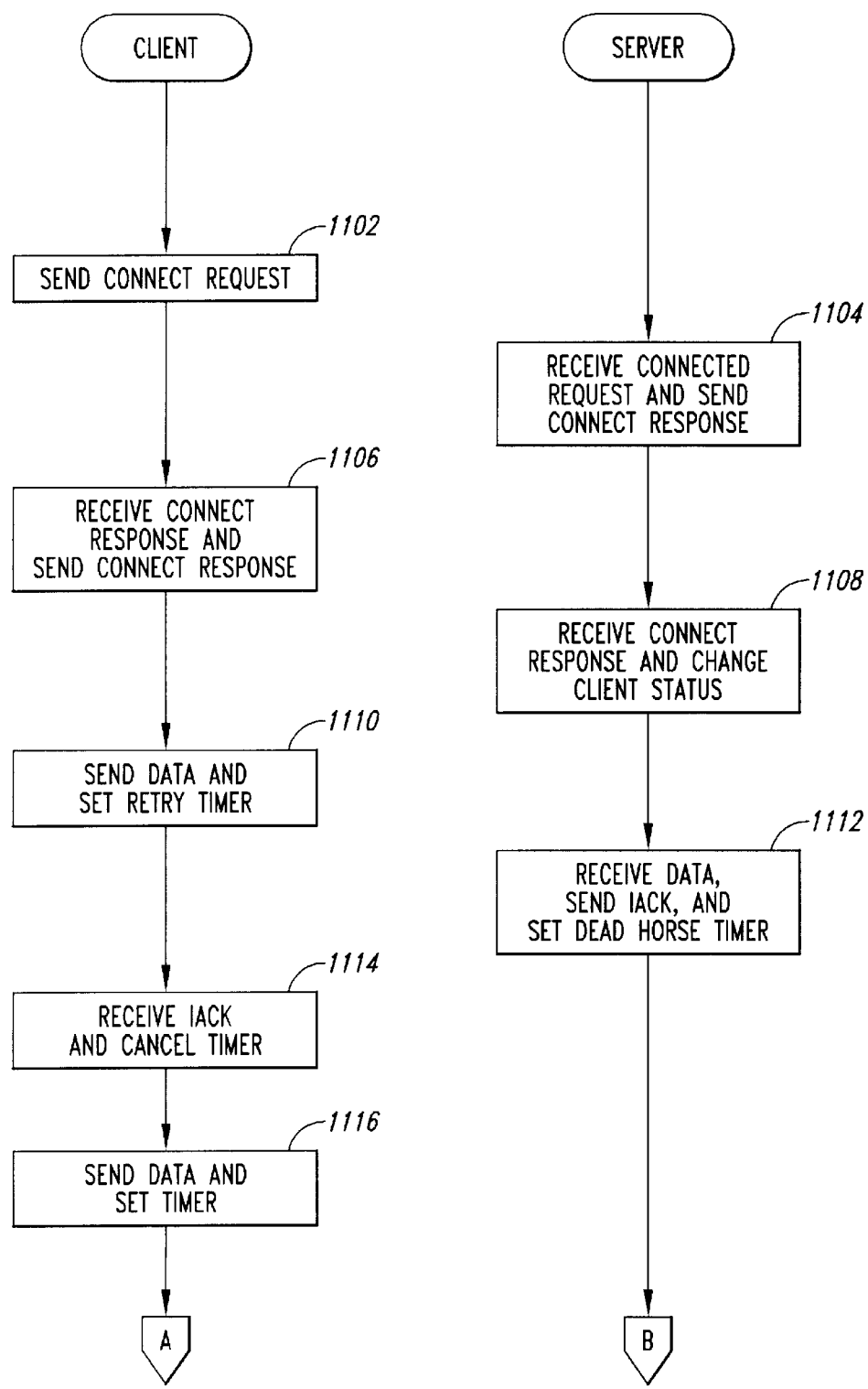
FIGS. 11A, 11B, and 11C depict a flowchart of exemplary steps performed by the client UDP+ layer of FIG. 9 when transferring data to the server UDP+ layer of FIG. 5.
Figure 11B:
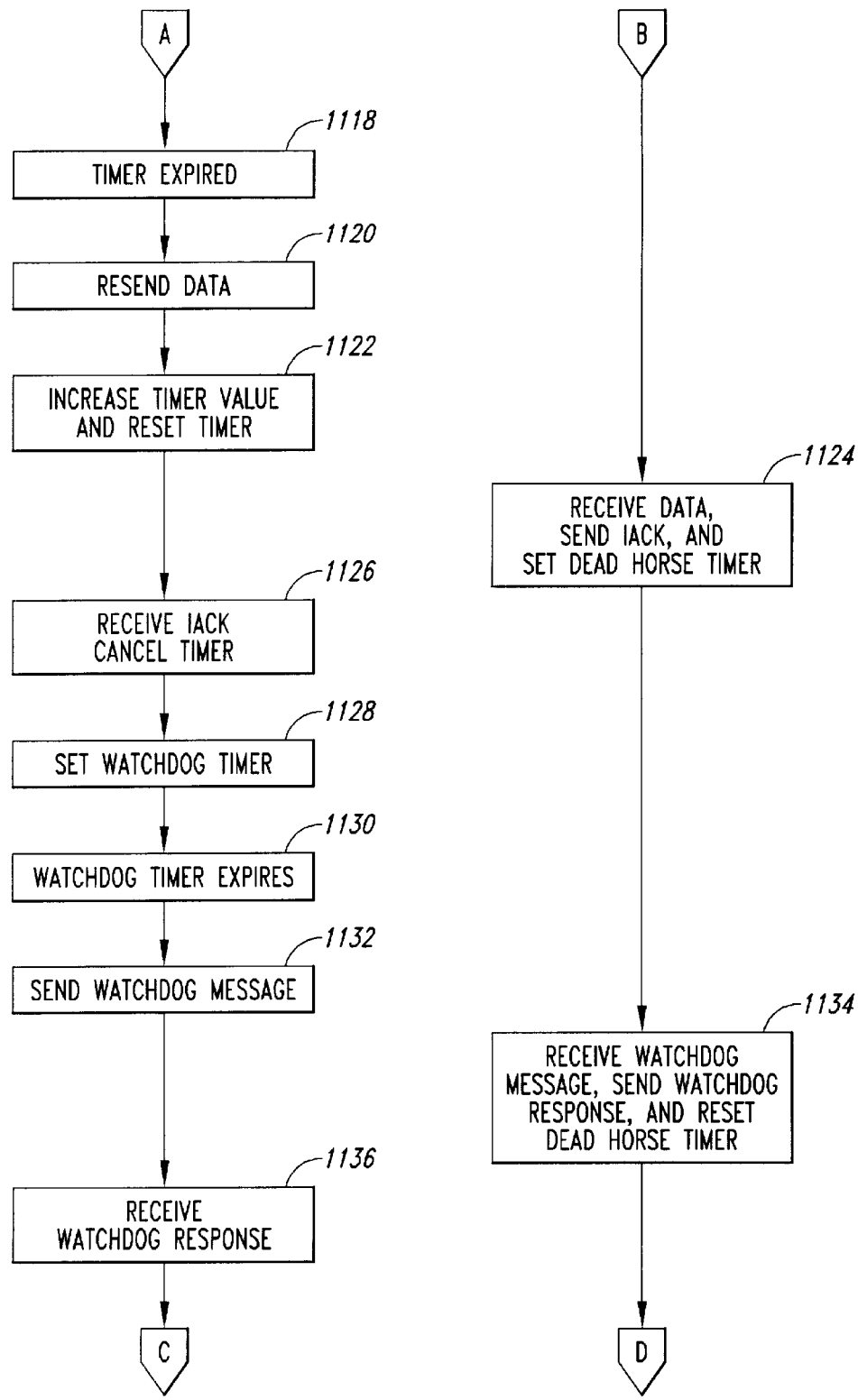
Figure 11C:
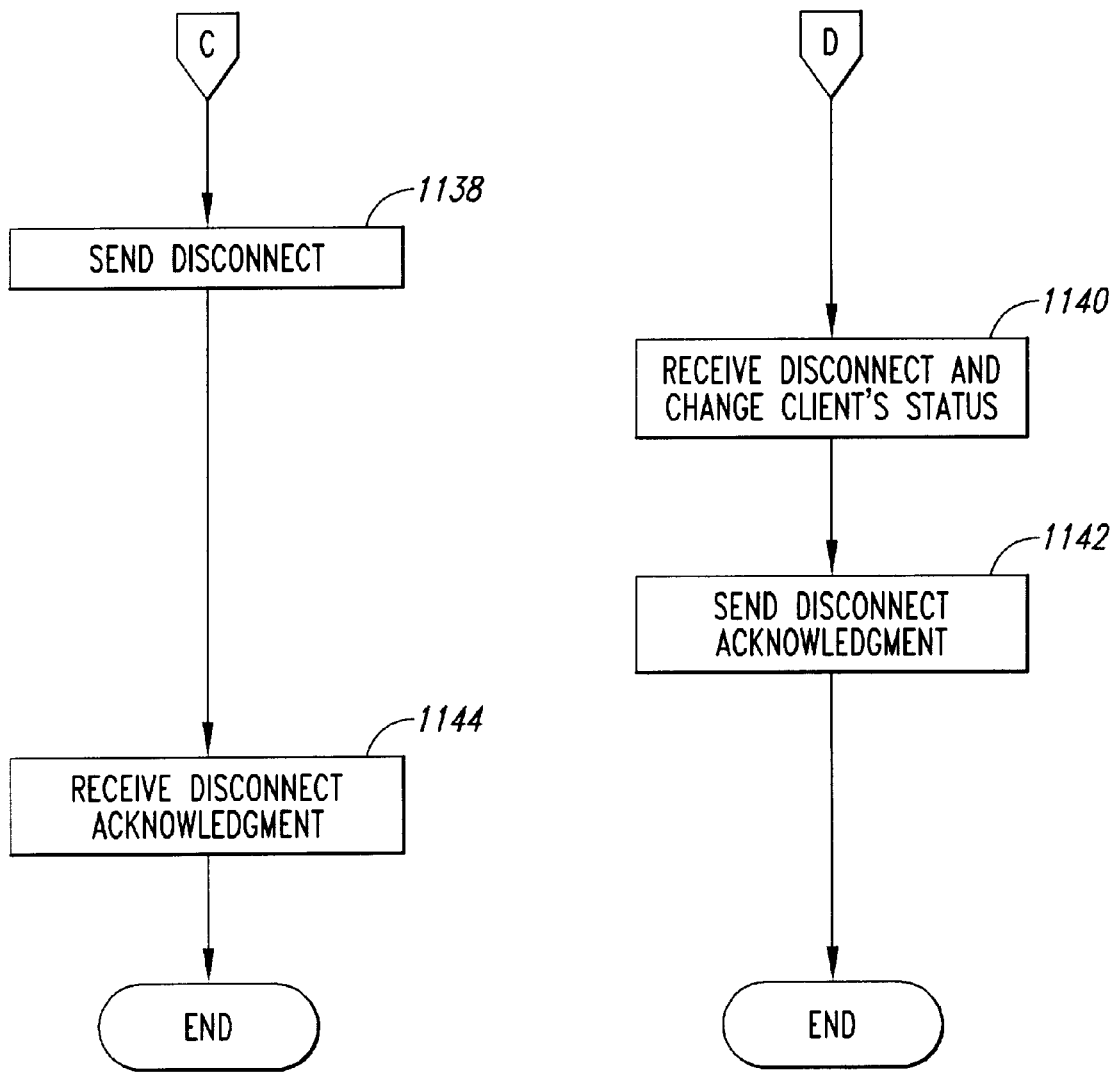

FIGS. 11A, 11B, and 11C depict a flowchart of an exemplary usage of the previously described messages during a persistent session by both the UDP+ layer 514 on the server 302 and the UDP+ layer 916 on the client 304. As such, this flowchart describes the use of the retry timer, the use of the watchdog message, and other features of the system that facilitate the reliable transfer of data. This flowchart chronologically presents both the client and server UDP+ layer's processing. Although the example describes the client sending data to the server, one skilled in the art will appreciate that the server can send data to the client.

In response to being invoked by the client application 914, the client UDP+ layer 916 starts a data transfer by initiating a connection and sending a connect request to the server UDP+ layer 514 (step 1102). The server UDP+ layer 514 receives the connect request and sends a connect response to the client UDP+ layer 916 (step 1104). The client UDP+ layer 916 receives the connect response and sends a second connect response (step 1106). The server UDP+ layer 514 receives the second connect response and changes the connection status of the client application 914 to indicate that the client application is connected to the server (step 1108). In this step, the server UDP+ layer 514 accesses the connection structure and changes the client application's status field 618 to indicate that the client application 914 is connected. After this processing, a connection has been established, and the client UDP+ layer 916 and the server UDP+ layer 514 can transfer data back and forth.

After the connection has been established, the client UDP+ layer 916 sends a data message to the server UDP+ layer 514 and sets a retry timer (step 1110). The data for the data message is received from the client application 914. The retry timer is a timer set to a predetermined value (e.g., 300 ms to 5 sec.) such that if the client UDP+ layer 916 does not receive an acknowledgment to the data message within this time, the client UDP+ layer will resend the message, thus facilitating the reliable transfer of the data to the server UDP+ layer 514. In this example, the server UDP+ layer 514 receives the data message and sends an IAck message to the client UDP+ layer 916 (step 1112). The server UDP+ layer 514 also sets a dead horse timer to a preset value ranging between 1 and 3,600 minutes. If the dead horse timer expires before the server UDP+ layer 514 receives a message from the client UDP+ layer 916, then the server UDP+ layer changes the client application's connection status to disconnected, thus implicitly disconnecting the client application. In this example, the client UDP+ layer 916 receives the IAck message and cancels the retry timer (step 1114).

Eventually, the client UDP+ layer 916 receives more data from the client application 914 that needs to be sent to the client UDP+ layer 916. Consequently, the client UDP+ layer 916 both sends a second data message to the server UDP+ layer 514 and sets the retry timer (step 1116). After sending the second data message, the retry timer expires before the client UDP+ layer 916 receives an acknowledgment (step 1118 in FIG. 11B). The expiration of the retry timer indicates that an acknowledgment has not been received in a sufficient amount of time, and therefore, the client UDP+ layer 916 resends the second data message (step 1120). The client UDP+ layer 916 then increases the retry timer value by a predetermined increment, such as 30% and resets the retry timer (step 1122). The increase has a ceiling that the retry timer will not exceed. The ceiling, which is configurable, ranges between 2 seconds and 60 seconds. It should be appreciated that, due to the sometimes unreliable nature of wireless communications, the second data message may not arrive at the server UDP+ layer. In this situation, the processing of step 1122 is repeated, and if the message has been sent 7 times, the server UDP+ layer 514 will change the client application's connection status to not responding. After increasing the timer value and resetting the timer, the server UDP+ layer 514 receives the resent data message, sends an IAck message to the client UDP+ layer 916, and resets the dead horse timer (step 1124). The client UDP+ layer 916 receives the IAck message and cancels the retry timer (step 1126).

At this point in the client UDP+ layer's processing, the client UDP+ layer 916 may not have data to send to the server UDP+ layer 514, because the client application 914 has not provided it with any. However, the client UDP+ layer 916 may want to remain connected to the server UDP+ layer 514, because the client application 914 eventually will have more data and does not want to incur the overhead of reestablishing the connection. Therefore, to keep the connection alive, the client UDP+ layer 916 sends a watchdog timer to the server UDP+ layer 514, so that the client UDP+ layer will be notified when it should send a watchdog message to the server UDP+ layer to keep the connection alive (step 1128). When the watchdog timer expires (step 1130), the client UDP+ layer 916 sends the watchdog message to the server UDP+ layer 514 (step 1132). The server UDP+ layer 514 receives the watchdog message, sends a watchdog response to the client UDP+ layer 916, and resets the dead horse timer (step 1134). The client UDP+ layer 916 receives the watchdog response (step 1136).

Assuming that the client application 914 has completed sending all of the desired data to the server, the client application may instruct the client UDP+ layer 916 to terminate the connection; in this case, the client UDP+ layer sends a disconnect message to the server UDP+ layer 514 (step 1138 in FIG. 11C). The server UDP+ layer 514 receives the disconnect message and changes the client application's status in the connection structure from connected to disconnected (step 1140). The server UDP+ layer 514 then sends a disconnect acknowledgment to the client UDP+ layer 916 (step 1142), and the client UDP+ layer receives the disconnect acknowledgment (step 1144). At this point, both the client UDP+ layer 916 and the server UDP+ layer 514 are disconnected and must reestablish a connection before they can transfer data.

While the present invention has been described with reference to an exemplary embodiment thereof, those skilled in the art will know of various changes in form and detail that may be made without departing from the spirit and scope of the claimed invention as defined in the appended claims. Such changes may include different messages being transferred between the client UDP+ layer and server UDP+ layer, different fields being utilized within the messages, and different counter values used in the messages.

All patents and applications cited herein are hereby incorporated by reference.

In general, the terms used in the following claims should not be construed to limit the invention to the specific embodiments disclosed in both the specification and the claims, but should be construed to include all systems that operate in accordance with the claims. Accordingly, the invention is not limited by the disclosure, but instead its scope is to be determined entirely by the following claims.

What is claimed is:

1. A method in a data processing system for transferring data between a client application program on a client and a server application program on a server via wireless communications, the client and the server each having a wireless communications subsystem for transferring the data, an internet protocol (IP) link layer for interfacing with the wireless communication subsystem, a user datagram protocol (UDP) layer for interfacing with the IP layer, and a UDP+ layer for providing reliable communications over the UDP layer, comprising:

the client application program invoking the UDP+ layer of the client to create a connection between the UDP+ layer of the client and the UDP+ layer of the server;

responsive to the invocation, the UDP+ layer of the client creating a connect message requesting establishment of a connection with the UDP+ layer of the server, storing the connect message in a first packet suitable to the UDP layer of the client, and invoking the UDP layer of the client to send the packet to the UDP layer of the server as a first datagram message, wherein the UDP layer of the client passes the first datagram message to the IP layer of the client, and wherein the IP layer of the client sends the first datagram message to the server via the wireless communications subsystem of the client;

the UDP+ layer of the server receiving the connect message, establishing a connection with the UDP+ layer of the client, creating a response message indicating that the connection has been established, storing the response message into a second packet that is suitable to the UDP layer of the server, and invoking the UDP layer of the server to send the second packet to the UDP layer of the client as a second datagram message, wherein the UDP layer of the server passes the second datagram message to the IP layer of the server, and wherein the IP layer of the server sends the second datagram message to the client via the wireless communications subsystem of the server;

the UDP+ layer of the client receiving the response message such that the connection is established;

the client application program providing data to the UDP+ layer of the client;

the UDP+ layer of the client receiving the data, and sending a first portion of the received data to the UDP+ layer of the server in a first data message requesting a first acknowledgment that the first data message has been successfully received by the UDP+ layer of the server;

the UDP+ layer of the server receiving the first data message, transferring the data to the server application program, and sending the first acknowledgment to the UDP+ layer of the client indicating that the first data message has been successfully received;

the UDP+ layer of the client receiving the first acknowledgment and before a second portion of the received data can be sent, determining that the connection has terminated, reestablishing the connection responsive to determining that the connection has terminated, and sending the second portion of the received data to the UDP+ layer of the server in a second data message over the reestablished connection to complete the data transfer; and the UDP+ layer of the server receiving the second data message over the reestablished connection and transferring the second portion of the received data to the server application program such that the data transfer is complete.

2. The method of claim 1 wherein the server has a data structure containing connection-related information and wherein establishing a connection includes storing an identifier of the client into the data structure.

3. The method of claim 1 wherein the server has a data structure containing connection-related information, wherein the data structure has an entry for the client with an indication of whether the client is connected, and wherein establishing a connection includes setting the indication to indicate that the client is connected.

4. The method of claim 1, further including before the client application program invokes the UDP+ layer, the UDP+ layer of the client creating a persistent session such that all data received by the UDP+ layer of the client during the persistent session is transferred to the UDP+ layer of the server regardless of whether the connection terminates during the transfer.

5. The method of claim 1, further comprising:

before the client application program invokes the UDP+ layer, the UDP+ layer of the client creating a persistent session upon power up of the client such that all data received by the UDP+ layer of the client during the persistent session is transferred to the UDP+ layer of the server regardless of whether the connection terminates during the transfer; and after the UDP+ layer of the server receives the second data message, terminating the persistent session by the UDP+ layer of the client upon power down of the client.

6. The method of claim 1, further comprising:

before the client application program invokes the UDP+ layer, the UDP+ layer of the client creating a persistent session upon receiving user input such that all data received by the UDP+ layer of the client during the persistent session is transferred to the UDP+ layer of the server regardless of whether the connection terminates during the transfer; and after the UDP+ layer of the server receives the second data message, terminating the persistent session by the UDP+ layer of the client upon receiving additional user input.

7. The method of claim 1 wherein determining that the connection has terminated includes receiving a disconnection request from the server.

8. The method of claim 1 wherein determining that the connection has terminated includes determining that the client has not received an expected communication from the server for more than a predetermined amount of time.

9. The method of claim 1 wherein determining that the connection has terminated includes determining that a communication error has occurred such that the client and the server are unable to communicate and that the client has not received an expected communication from the server for more than a predetermined amount of time.

10. The method of claim 1 wherein providing data includes the client application program discarding the data after providing the data to the UDP+ layer of the client.

11. A method in a data processing system for transferring data between a source computer and a destination computer via a communication mechanism, the source computer and the destination computer having an application program and a connection-oriented protocol stack having a user datagram protocol ("UDP") layer, the connection-oriented protocol stack configured to transfer the data between the application program on the source computer and the application program on the destination computer, the method performed by the connection-oriented protocol stack on the source computer, comprising:

establishing a connection with the connection-oriented protocol stack on the destination computer;

receiving data from the application program on the source computer, the received data to be transferred to the application program on the destination computer;

sending at least one message containing a portion of the received data to the UDP layer in the connection-oriented protocol stack on the destination computer;

sending the portion of the received data to the application program on the destination computer;

determining that the connection has terminated after sending the at least one message;

reestablishing the connection with the protocol stack on the destination computer responsive to the termination of the connection; and completing the data transfer after reestablishing the connection by sending to the connection-oriented protocol stack on the destination computer a plurality of messages containing remaining portions of the received data that have not already been sent to the protocol stack on the destination computer.

12. The method of claim 11 wherein sending at least one message includes sending the at least one message requesting an acknowledgment from the destination computer that the at least one message was transferred successfully, and wherein determining includes determining that the connection has terminated when the acknowledgment has not been received in a predetermined amount of time.

13. The method of claim 11 wherein determining includes receiving a request to terminate the connection from the destination computer.

14. The method of claim 11 wherein the messages sent between the source computer and the destination computer have associated sequence numbers, and wherein reestablishing the connection includes synchronizing the sequence numbers between the source computer and the destination computer.

15. The method of claim 11 wherein the connection-oriented protocol stack on the source computer has context information associated with the connection and wherein determining includes retaining the context information.

16. A method in a data processing system for performing a data transfer between a source and a destination via wireless communications, the source and the destination having an application program and a connection-oriented protocol stack having a user datagram protocol ("UDP")

layer, the connection-oriented protocol stack configured to transfer the data between the application program on the source and the application program on the destination, the method performed by the connection-oriented protocol stack of the destination, comprising:

establishing a connection with the source;

receiving a first portion of data from the connection-oriented protocol stack on the source over the established connection, the data being received data that is received by the connection-oriented protocol stack of the source from the application program of the source;

sending the first portion of data from the UDP layer to a connection-oriented protocol layer that sends the first portion of data to the application program of the destination;

determining that the established connection has terminated after receiving the portion of the received data;

reestablishing the connection; and receiving remaining portions of the received data to complete the data transfer.

17. The method of claim 16, further including sending to the source a message requesting an acknowledgment that indicates that the source received the message successfully and wherein determining includes determining that the connection has terminated when the acknowledgment has not been received in a predetermined amount of time.

18. The method of claim 16 wherein determining includes receiving a request to terminate the connection from the source.

19. The method of claim 16 wherein the first portion and the remaining portions of the data are received in messages having associated sequence numbers, and wherein reestablishing the connection includes synchronizing the sequence numbers between the source and the destination.

20. The method of claim 16 wherein the connection-oriented protocol layer on the destination has context information associated with the connection and wherein determining includes retaining the context information.

21. A method in a data processing system for transferring data between a source program and a destination program using a source communication mechanism having a user datagram protocol (UDP) layer and a destination communication mechanism, the method performed by the source program, comprising:

receiving data for transfer to the destination program; and providing the received data to the source communication mechanism, wherein the source communication mechanism establishes a connection to the destination communication mechanism and uses the UDP layer to transfer the received data to the destination communication mechanism even though the connection is terminated at least once while the data is being transferred, wherein the source communication mechanism transmits the received data in a plurality of portions and the destination communication mechanism transmits each received portion to the destination program.

22. The method of claim 21 wherein providing includes discarding the received data after the received data is provided to the source communication mechanism.

23. The method of claim 21 wherein the data processing system includes a bar-code scanner for receiving bar-code information, and wherein receiving data includes receiving the received data from the bar-code scanner.

24. A method in a data processing system for transferring data between a source computer and a destination computer, the source computer and the destination computer having an application program and a connection-oriented protocol stack having a user datagram protocol (UDP) layer, the connection-oriented protocol stack configured to transfer the data between the source computer and the destination computer, the method performed by the application program of the destination computer, comprising:

receiving the data from the connection-oriented protocol stack of the source computer, the data originating from the application program of the source computer and the data passed to the connection-oriented protocol stack of the source computer by the application program of the source computer, wherein the connection-oriented protocol stack of the source computer sends the passed data to the connection-oriented protocol stack of the destination computer over a plurality of separately established connections and wherein the connection-oriented protocol stack of the source computer sends the passed data in a plurality of data portions such that the connection-oriented protocol stack of the destination computer transfers each data portion to the application program of the destination computer upon receipt; and storing the data onto the destination computer.

25. A bar-code scanner for transferring data to a computer application, comprising:

a radio communications subsystem for transferring the data to the computer application;

a bar-code input device that reads bar codes and generates bar-code information;

a memory, further comprising:

an application program for receiving the bar-code information from the bar-code input device and for transferring the bar-code information to the computer application;

a connection component for receiving the bar-code information from the application program, for establishing a first connection with the computer application, for transferring a first portion of the received bar-code information over the first connection to the computer application, for determining that the first connection has terminated, for establishing a second connection to the computer application, and for transferring a second portion of the received bar-code information over the second connection to the computer application to complete the transfer of the bar-code information to the computer application; and a user datagram protocol ("UDP") transport layer for transferring the first portion and the second portion of the received bar-code information to the computer application as a series of datagram messages via the radio communications subsystem; and a processor for running the UDP transport layer, the connection component, and the application program.

26. The bar-code scanner of claim 25 wherein the connection component determines that the first connection has terminated when an expected communication is not received in a predetermined amount of time due to a communications error.

27. The bar-code scanner of claim 25 wherein the connection component determines that the first connection has terminated when the connection component receives a disconnect request from the computer.

28. A data structure encoded on a computer-readable memory device for use in maintaining a connection between a server and a plurality of clients in a data processing system when transferring data in data portions using a communication mechanism having a user datagram protocol ("UDP") transport layer, the communication mechanism configured to transmit data portions to the server upon receipt, the data structure having entries, each entry comprising:

a client identifier indicating one of the plurality of the clients; and a field containing an indication of whether the client is connected to the server, wherein the communication mechanism receives the data to be transferred from an application program and uses the UDP layer to transfer the received data regardless of whether a connection has terminated, wherein the communication mechanism completely transfers the received data by establishing a first connection to the client, storing in the field an indication that indicates that the client is connected to the server, transferring a first portion of the received data to the server, receiving an indication that the first connection has terminated, storing in the field an indication that the client and the server are disconnected, establishing a second connection with the client, storing in the field an indication that the client and the server are connected, and transferring a second portion of the received data to the server over the second connection.

29. A client device for transferring data to a server device via wireless communications, comprising:

a wireless communications subsystem for transferring the data to the server device;

a memory, further comprising:

an application program for transferring the data to the server device;

a connection-oriented communication mechanism for receiving the data from the application program, and for establishing a persistent session with the server device such that the received data is completely transferred to the server device over a plurality of connections with the server device during the persistent session; and a user datagram protocol ("UDP") layer for transferring the data to the server device via the wireless communications subsystem, wherein the data is transmitted to the server device in a plurality of portions, with each portion being transferred to the server device upon receipt; and a processor for running the application program, the connection-oriented communication mechanism, and the UDP layer.

30. The client device of claim 29 wherein the connection-oriented communication mechanism creates the persistent session upon power up and terminates the persistent session upon power down.

31. The client device of claim 29 wherein the connection-oriented communication mechanism terminates the persistent session upon receiving a reset command from a user.

32. The client device of claim 29 wherein the client device is a hand-held device.

33. A destination computer for receiving data from a source computer having a source application program and a source connection-oriented protocol stack, comprising:

a communications subsystem for receiving the data from the source computer;

a memory, further comprising:

a destination connection-oriented protocol stack having a user datagram protocol ("UDP") layer, the connection-oriented protocol stack configured to establish a connection with the source connection-oriented protocol stack, configured to receive a first portion of data from the source connection-oriented protocol stack over the established connection program using the UDP layer and configured to transfer the first portion of data to the destination application program, the data being received data that is received by the source connection-oriented protocol stack from the source application, the destination connection-oriented protocol stack further configured to receive an indication that the established connection has terminated after receiving the first portion of the received data, to receive an indication that the connection has been reestablished, and to receive remaining portions of the received data over the reestablished connection to complete the data transfer and to transfer the remaining portions to the destination application program; and a destination application program configured to receive the first portion and the remaining portions of the received data from the destination connection-oriented protocol stack; and a processor for running the destination connection-oriented protocol stack and the destination application program.

34. A computer-readable medium containing instructions for controlling a data processing system to perform a method for transferring data between a source computer and a destination computer via a communication mechanism, the source computer and the destination computer having an application program and a connection-oriented protocol stack having a user datagram protocol ("UDP") layer, the connection-oriented protocol stack configured to transfer the data between the application program on the source computer and the application program on the destination computer, the method performed by the connection-oriented protocol stack on the source computer, comprising:

establishing a connection with the connection-oriented protocol stack on the destination computer;

receiving data from the application program on the source computer, the received data to be transferred to the application program on the destination computer;

sending at least one message containing a portion of the received data to the UDP layer in the connection-oriented protocol stack on the destination computer that then sends the received data to the destination application;

determining that the connection has terminated after sending the at least one message;

reestablishing the connection with the protocol stack on the destination computer responsive to the termination of the connection; and completing the data transfer after reestablishing the connection by sending to the connection-oriented protocol stack on the destination computer a plurality of messages containing remaining portions of the received data that have not already been sent to the protocol stack on the destination computer, wherein the connection-oriented protocol stack sends the remaining portions of the received data to the destination application upon receipt.

35. The computer-readable medium of claim 34 wherein sending at least one message includes sending the at least one message requesting an acknowledgment from the destination computer that the at least one message was transferred successfully, and wherein determining includes determining that the connection has terminated when the acknowledgment has not been received in a predetermined amount of time.

36. The computer-readable medium of claim 34 wherein determining includes receiving a request to terminate the connection from the destination computer.

37. The computer-readable medium of claim 34 wherein the messages sent between the source computer and the destination computer have associated sequence numbers, and wherein reestablishing the connection includes synchronizing the sequence numbers between the source computer and the destination computer.

38. The computer-readable medium of claim 34 wherein the connection-oriented protocol stack on the source computer has context information associated with the connection and wherein determining includes retaining the context information.

39. A computer-readable medium containing instructions for controlling a data processing system to perform a method for performing a data transfer between a source and a destination via wireless communications, the source and the destination having an application program and a connection-oriented stack having a user datagram protocol (UDP) layer, the connection-oriented protocol stack configured to transfer the data between the application program on the source and the application program on the destination, the method performed by the connection-oriented protocol stack of the destination, comprising:

establishing a connection with the source;

receiving a first portion of data from the connection-oriented protocol stack on the source over the established connection, the data being received data that is received by the connection-oriented protocol stack of the source from the application program of the source;

determining that the established connection has terminated after receiving the portion of the received data;

reestablishing the connection; and receiving remaining portions of the received data to complete the data transfer from the connection-oriented protocol layer of the source and sending the remaining portions to the application program of the destination.

40. The computer-readable medium of claim 39, further including sending to the source a message requesting an acknowledgment that indicates that the source received the message successfully and wherein determining includes determining that the connection has terminated when the acknowledgment has not been received in a predetermined amount of time.

41. The computer-readable medium of claim 39 wherein determining includes receiving a request to terminate the connection from the source.

42. The computer-readable medium of claim 39 wherein the first portion and the remaining portions of the data are received in messages having associated sequence numbers, and wherein reestablishing the connection includes synchronizing the sequence numbers between the source and the destination.

43. The computer-readable medium of claim 39 wherein the connection-oriented protocol layer on the destination has context information associated with the connection and wherein determining includes retaining the context information.

44. A computer-readable medium containing instructions for controlling a data processing system to perform a method for transferring data between a source program and a destination program using a source communication mechanism having a user datagram protocol (UDP) layer and a destination communication mechanism, the method performed by the source program, comprising:

receiving data for transfer to the destination program; and providing the received data to the source communication mechanism, wherein the source communication mechanism establishes a connection to the destination communication mechanism and uses the UDP layer to transfer the received data to the destination communication mechanism even though the connection is terminated at least once while the data is being transferred, wherein the source communication mechanism transfers the received data to the destination communication mechanism in portions and wherein the destination communication mechanism transfers each received portion to the destination program.

45. The computer-readable medium of claim 44 wherein providing includes discarding the received data after the received data is provided to the source communication mechanism.

46. The computer-readable medium of claim 44 wherein the data processing system includes a bar-code scanner for receiving bar-code information, and wherein receiving data includes receiving the received data from the bar-code scanner.

47. A computer-readable medium containing instructions for controlling a data processing system to perform a method for transferring data between a source computer and a destination computer, the source computer and the destination computer having an application program and a connection-oriented protocol stack having a user data-gram protocol (UDP) layer, the connection-oriented protocol stack configured to transfer the data between the source computer and the destination computer, the method performed by the application program of the destination computer, comprising:

receiving the data from the connection-oriented protocol stack of the source computer, the data originating from the application program of the source computer and the data passed to the connection-oriented protocol stack of the source computer by the application program of the source computer, wherein the connection-oriented protocol stack of the source computer sends the passed data to the connection-oriented protocol stack of the destination computer over a plurality of connections; and transferring the data to the application program of the destination computer upon receipt.

48. A method in a data processing system for transferring data between a client application program on a client and a server application program on a server via wireless communications, the client and the server each having a wireless communications subsystem for transferring the data, an internet protocol (IP) link layer for interfacing with the wireless communication subsystem, a user datagram protocol (UDP) layer for interfacing with the IP layer, and a UDP+ layer for providing reliable communications over the UDP layer, comprising:

the client application program invoking the UDP+ layer of the client to create a connection between the UDP+ layer of the client and the UDP+ layer of the server;

responsive to the invocation, the UDP+ layer of the client creating a connect message requesting establishment of a connection with the UDP+ layer of the server, storing the connect message in a first packet suitable to the UDP layer of the client, and invoking the UDP layer of the client to send the packet to the UDP layer of the server as a first datagram message, wherein the UDP layer of the client passes the first datagram message to the IP layer of the client, and wherein the IP layer of the client sends the first datagram message to the server via the wireless communications subsystem of the client;

the UDP+ layer of the server receiving the connect message, establishing a connection with the UDP+ layer of the client, creating a response message indicating that the connection has been established, storing the response message into a second packet that is suitable to the UDP layer of the server, and invoking the UDP layer of the server to send the second packet to the UDP layer of the client as a second datagram message, wherein the UDP layer of the server passes the second datagram message to the IP layer of the server, and wherein the IP layer of the server sends the second datagram message to the client via the wireless communications subsystem of the server;

the UDP+ layer of the client receiving the response message such that the connection is established;

the client application program providing data to the UDP+ layer of the client;

the UDP+ layer of the client receiving the data, and sending a first portion of the received data to the UDP+ layer of the server in a first data message requesting a first acknowledgment that the first data message has been successfully received by the UDP+ layer of the server;

the UDP+ layer of the server receiving the first data message, transferring the data to the server application program, and sending the first acknowledgment to the UDP+ layer of the client indicating that the first data message has been successfully received;

the UDP+ layer of the client receiving the first acknowledgement and before a second portion of the received data can be sent, determining that the connection has terminated, reestablishing the connection responsive to determining that the connection has terminated, and sending the second portion of the received data to the UDP+ layer of the server in a second data message over the reestablished connection to complete the data transfer;

the UDP+ layer of the server receiving the second data message over the reestablished connection and transferring the second portion of the received data to the server application program such that the data transfer is complete;

the server application program invoking the UDP+ layer of the server;

the UDP+ layer of the server receiving the data, and sending a first portion of the received data to the UDP+ layer of the client in a third data message requesting a third acknowledgemnt that the third data message has been successfully received by the UDP+ layer of the client; and the UDP+ layer of the client receiving the third data message, transferring the data to the client application program, and sending the third acknowledgment to the UDP+ layer of the server indicating that the third data message has been successfully received.

49. A method in a data processing system for transferring data between a source program and a destination program using a source communication mechanism having a user datagram protocol (UDP) layer and a destination communication mechanism, the method performed by the source program, comprising:

receiving data for transfer to the destination program;

providing the received data to the source communication mechanism, wherein the source communication mechanism establishes a connection to the destination communication mechanism and uses the UDP layer to transfer the received data to the destination communication mechanism even though the connection is terminated at least once while the data is being transferred, wherein the source communication mechanism transmits the received data in a plurality of portions and the destination communication mechanism transmits each received portion to the destination program; and receiving data from the source communication mechanism, wherein the source communication mechanism has received the data from the destination communication mechanism that has received the data form the destination program.

* * * * *